(12) United States Patent
Muroya et al.

(10) Patent No.: US 8,578,417 B2
(45) Date of Patent: Nov. 5, 2013

(54) INFORMATION PROCESSING DEVICE AND EDITING METHOD

(75) Inventors: Masanori Muroya, Tokyo (JP); Kazuki Matoba, Tokyo (JP); Kei Hisano, Tokyo (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 12/763,910

(22) Filed: Apr. 20, 2010

(65) Prior Publication Data

US 2010/0281505 A1 Nov. 4, 2010

(30) Foreign Application Priority Data

Apr. 30, 2009 (JP) ................................. 2009-111248

(51) Int. Cl.
*H04N 5/445* (2011.01)

(52) U.S. Cl.
USPC ............................... 725/45; 725/44; 386/248

(58) Field of Classification Search
USPC ................. 725/131–134, 139–142, 151–153; 386/248, 55
See application file for complete search history.

(56) References Cited

U.S. PATENT DOCUMENTS

| | | | |
|---|---|---|---|
| 6,370,316 B1 | 4/2002 | Yamada et al. | |
| 7,636,510 B2 * | 12/2009 | Takagi et al. | 386/323 |
| 8,155,502 B2 * | 4/2012 | Morimoto et al. | 386/248 |
| 2002/0174430 A1 * | 11/2002 | Ellis et al. | 725/46 |
| 2003/0172383 A1 | 9/2003 | Takagi et al. | |
| 2004/0068606 A1 | 4/2004 | Kim et al. | |
| 2005/0259957 A1 | 11/2005 | Jung et al. | |
| 2007/0077023 A1 * | 4/2007 | Okuyama | 386/55 |
| 2008/0138043 A1 | 6/2008 | Murabayashi et al. | |

FOREIGN PATENT DOCUMENTS

| | | |
|---|---|---|
| EP | 1 311 121 | 5/2003 |
| EP | 1 936 981 | 6/2008 |
| EP | 2 018 055 | 1/2009 |
| JP | 2003-179864 | 6/2003 |
| JP | WO2006/016605 | 2/2006 |
| JP | 2008-283486 | 11/2008 |
| WO | WO 2006/009305 | 1/2006 |

OTHER PUBLICATIONS

European Search Report for European Patent No. 10250522.9 -2223 mailed Aug. 19, 2010 from the European Patent Office.

* cited by examiner

*Primary Examiner* — Annan Shang
(74) *Attorney, Agent, or Firm* — Finnegan, Henderson, Farabow, Garrett & Dunner, L.L.P.

(57) ABSTRACT

An information processing device includes: a storage unit configured to store one or a plurality of content playlists; a virtual playlist generating unit configured to generate a virtual playlist of the content and stored in the storage unit in a manner correlated with the content; a reception unit configured to receive user instructions; an editing unit configured to, in the event of receiving editing instructions as to the content, subject the virtual playlist to editing processing following the editing instructions; and a title display control unit configured to, in the event of receiving a title display instruction for displaying the title of the content on a predetermined display unit, displaying the title of the content based on the virtual playlist which has been subjected to the editing processing by the editing unit.

20 Claims, 38 Drawing Sheets

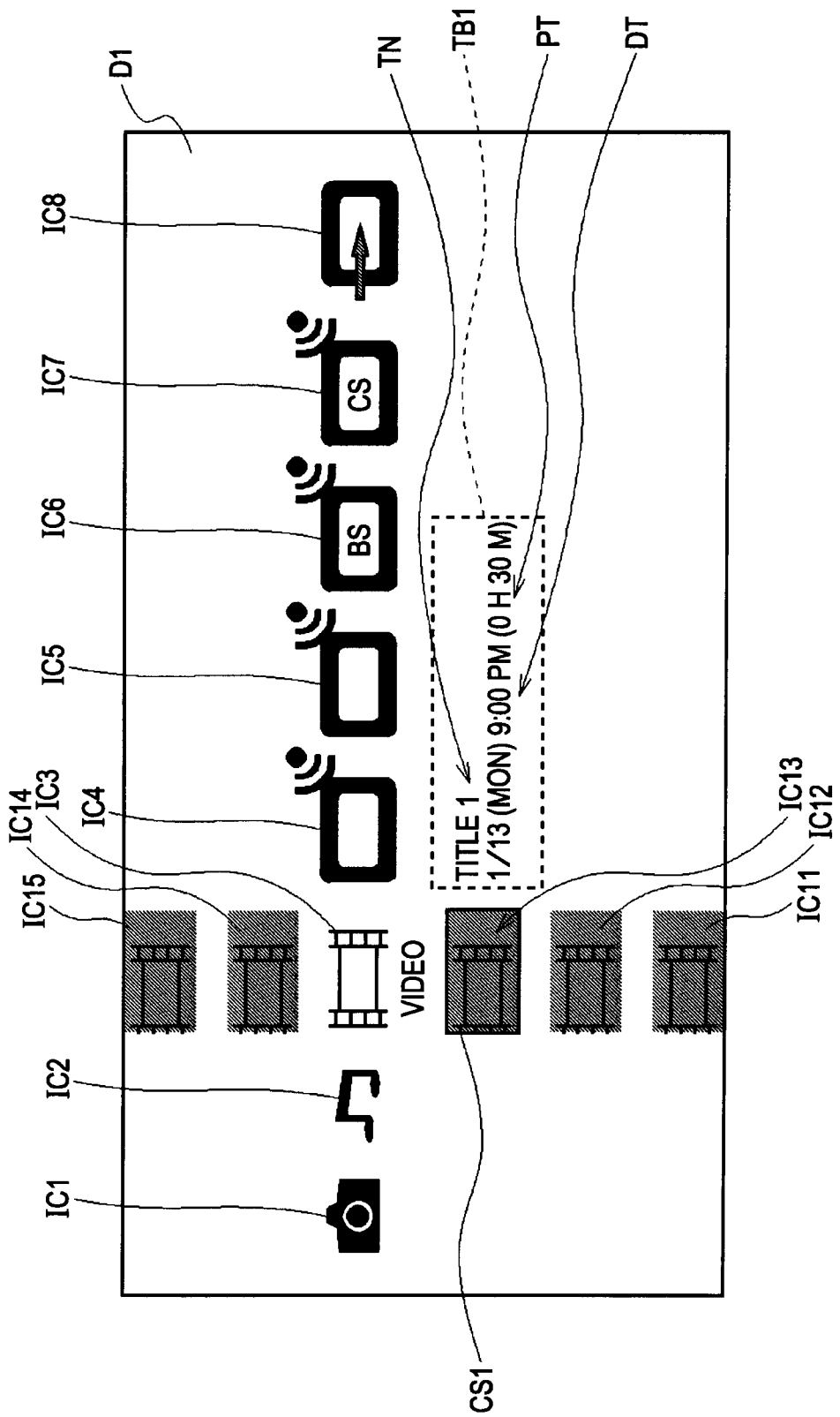

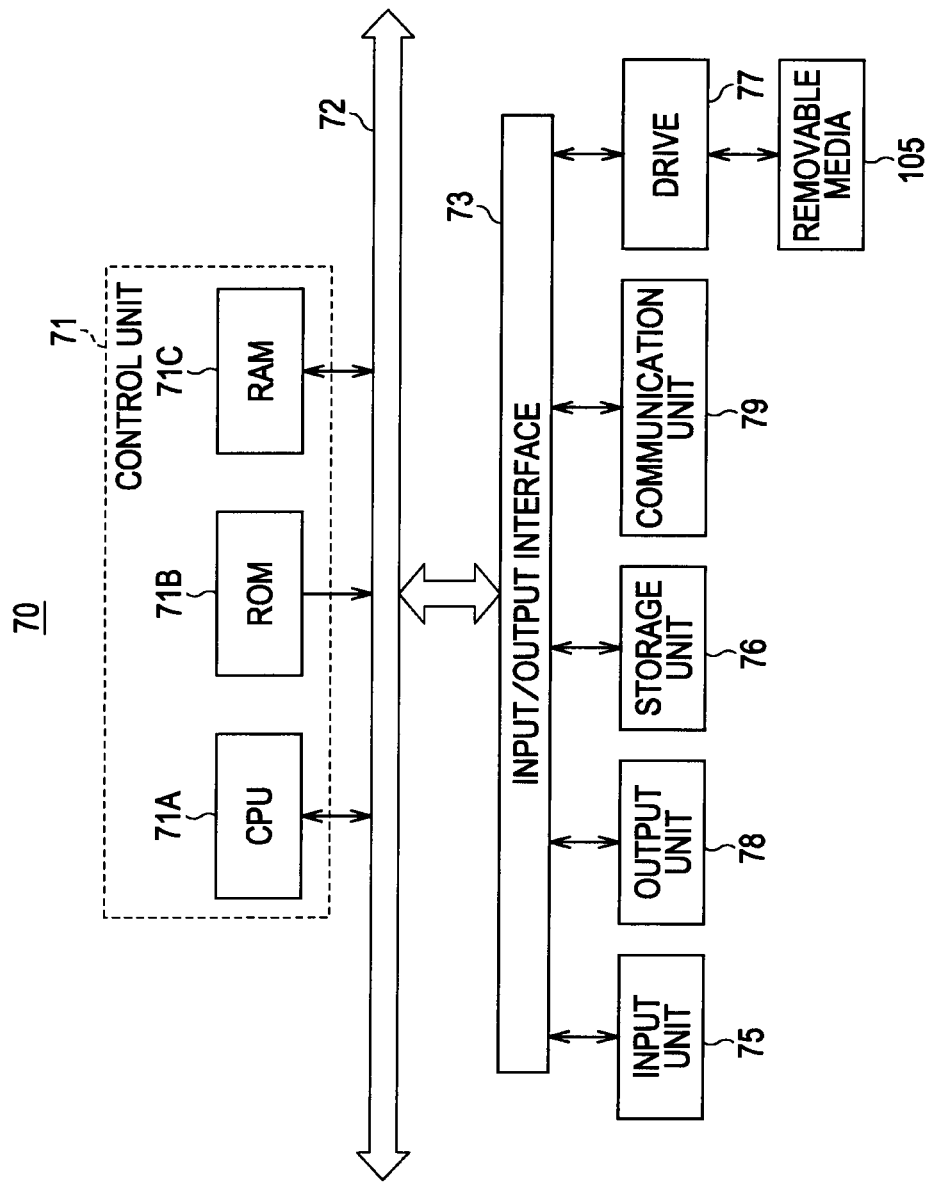

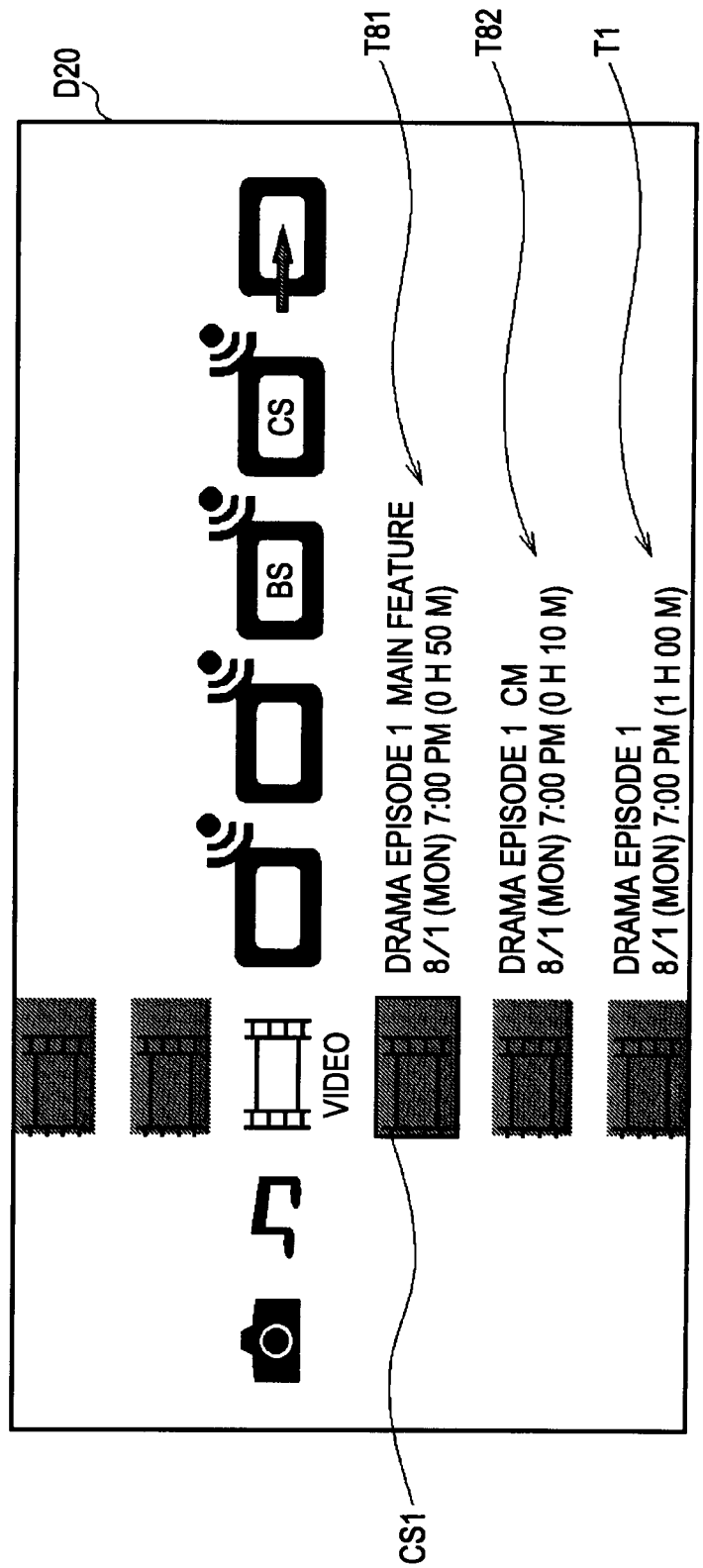

INFORMATION PROCESSING DEVICE AND EDITING METHOD

BACKGROUND OF THE INVENTION

1. Field of the Invention

The present invention relates to an information processing device and editing method, and is favorable for application to a recording/playing device that records and plays a broadcast television program, for example.

2. Description of the Related Art

In recent years, recording/playing devices that record television programs that are broadcast by television broadcasting onto a hard disk drive (HDD) or the like, and play according to user operations, have become common. Of these recording playing devices, there has been a proposal to enable editing operations as to the recorded television program (hereafter also called "content") based on operating instructions of the user (e.g., see Japanese Unexamined Patent Application Publication No. 2003-179864 (FIG. 4)).

These editing operations may be, for example, operations to delete unwanted portions of the content, operations to extract and link wanted portions from multiple contents and create a new title, and so forth.

SUMMARY OF THE INVENTION

However, with this recording/playing device, there have been problems that, for example, even in a case that the user desires to undo after a portion of the content has been deleted, the already-deleted portion is no longer available to be restored. Also, the user can prepare a title for saving and a title for editing beforehand, and edit while creating a backup appropriately, thereby realizing the redo of the editing operation. However, this sort of editing work calls for meticulous operations and management by the user.

Therefore there have been problems with recording/playing devices such as redoing of editing operation not being available, or frequent operations having to be performed in order to do so, and accordingly workability has been poor.

It has been found desirable to provide an information processing device and editing method that enables improved workability in the editing work of content.

According to an embodiment of the present invention, an information processing device includes a storage unit to store one or multiple content playlists, a virtual playlist generating unit to generate a content virtual playlist and correlate to the content and store in the storage unit, a reception unit to receive user instructions, an editing unit to perform editing processing according to the editing instructions as to a virtual playlist in the case of having received editing instructions as to the content, and a title display control unit to display the title of the content based on the virtual playlist subjected to editing processing by the editing unit in the event of having received title display instructions to display the content title on a predetermined display unit.

According to this configuration, the user can recognize the virtual playlist, similar to the content itself, and even after the editing processing, can continue to hold the original content and real playlist without modification.

According to an embodiment of the present invention, a predetermined playlist generating unit generates a virtual playlist representing playing instructions of one or multiple contents and stores this in a predetermined storage unit in a manner correlated with the content, user instructions are received, editing processing according to editing instructions as to a virtual playlist are performed by a predetermined editing unit in the case of having received editing instructions as to the content, and the title of the content is displayed on a display unit based on the virtual playlist which has been subjected to editing processing by the editing unit in the event of having received title display instructions to display the content title on the predetermined display unit.

According to this configuration, the user can be made to recognize the virtual playlist, similar to the content itself, and even after the editing processing, can continue to hold the original content and real playlist without modification.

According to the above configurations, the user can be made to recognize the virtual playlist, similar to the content itself, and even after the editing processing, can continue to hold the original content and real playlist without modification, thereby realizing an information processing device and editing method that can improve the workability of the content editing work.

BRIEF DESCRIPTION OF THE DRAWINGS

FIG. 4 is an outline diagram showing a title display screen;

FIG. 36 is an outline block diagram showing the configuration of the information processing device according to a second embodiment;

FIG. 38 is an outline diagram showing a title display screen after automatic extracting processing according to another embodiment.

DESCRIPTION OF THE PREFERRED EMBODIMENTS

Hereafter, modes to carry out the invention (hereafter called embodiments) will be described with reference to the diagrams. Note that the description will be performed in the following order.
1. First Embodiment (Recording/Playing Device)
2. Second Embodiment (Information Processing Device)
3. Other Embodiments

1. First Embodiment 1-1. Recording/Playing Device Configuration

Figure 1:
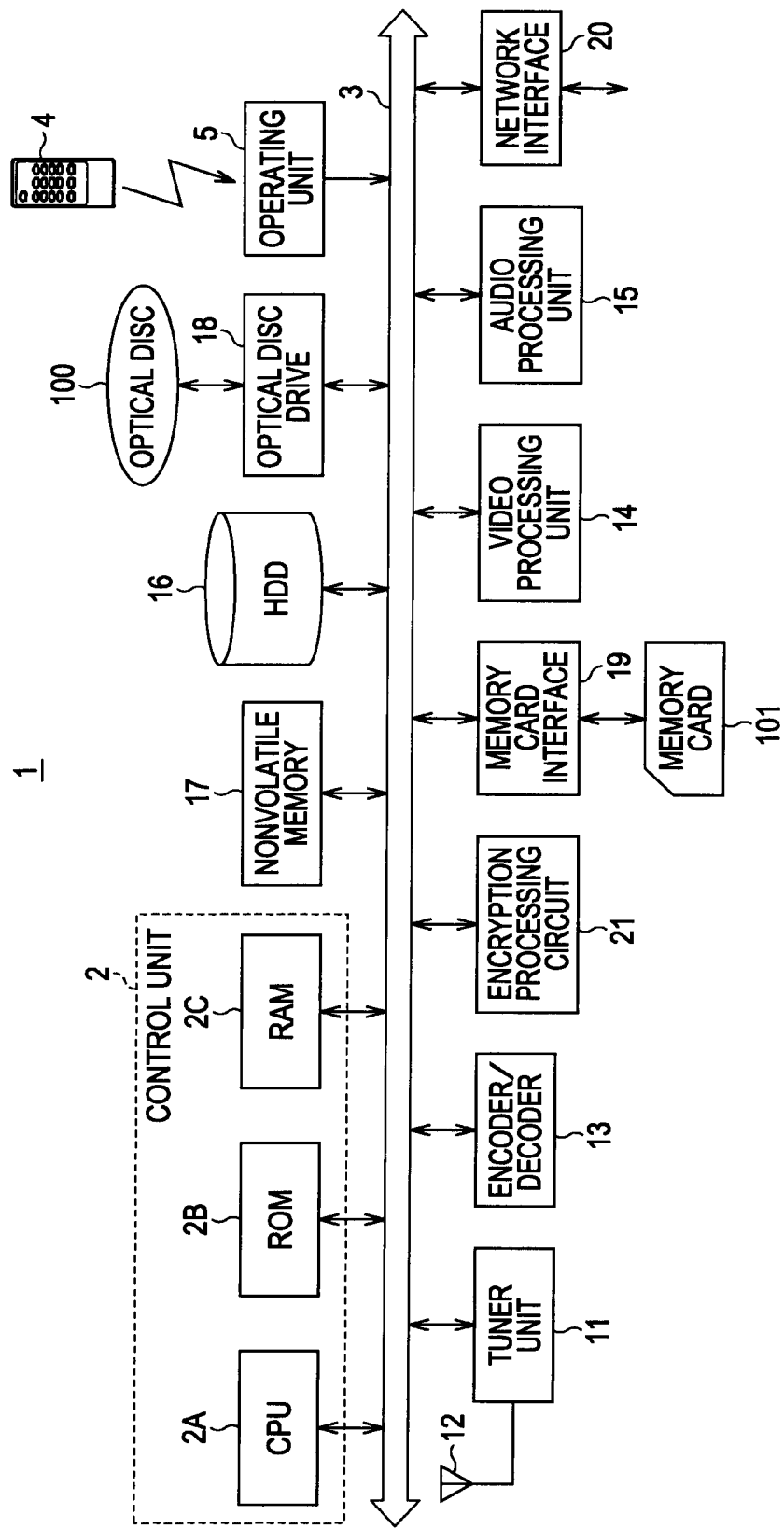
FIG. 1 is an outline diagram showing a configuration of a recording/playing device.

In FIG. 1, the recording playing device 1 is configured so as to be able to perform recording and playing of television programs overall, and also is configured so as to be able to perform editing operations as to the recording television program.

A control unit 2 centrally controls the recording/playing device 1 overall, and this control unit 2 and each portion are connected via a bus 3. The control unit 2 is configured centered by a CPU (Central Processing Unit) 2A, and is provided with a ROM (Read Only Memory) wherein various types of programs are stored and a RAM (Random Access Memory) uses as a work area for the CPU 2A. The control unit 2 loads the recording programs and editing programs and so forth read out from the ROM 2B to the RAM 2C and executes, thereby enabling various types of processing such as recording processing and editing processing and so forth of television programs.

The remote controller 4 is provided with a channel button to specify a broadcast channel, operating buttons such as recording, play, and fast-forward, direction buttons and determining buttons and so forth to operate a GUI (Graphical User interface) menu or the like. The remote controller 4 is configured so as to transmit a wireless signal according to the pressing operation of various buttons by the user.

The operating unit 5 receives the wireless signal transmitted from the remote controller 4 with a predetermined reception unit (not shown) and converts this to an instruction command made up of electrical signals, and sends this instruction command to the control unit 2 via the bus 3. The control unit 2 executes various types of processing in accordance with instruction commands. For example, in the case that the channel button of the remote controller 4 is pressed, a channel instruction command to instruct a channel as to the control unit 2 from the operating unit 5 having received the wireless signal is sent. Accordingly the control unit 2 instructs the channel according to the channel instruction command as to a tuner unit 11.

The tuner unit 11 handles terrestrial digital broadcast waves, BS (Broadcasting Satellite) digital broadcast waves, and CS (Communication Satellite) digital broadcast waves. The tuner unit 11 selects a carrier wavelength band appropriate to the channel instructed from the control unit 2, of the received signals received via an antenna 12. Next, the tuner unit 11 generates a transport stream by performing QPSK (Quadrature Phase Shift Keying) demodulating processing or the like and error correcting processing or the like as to the selected received signal.

Further, the tuner unit 11 separates a video stream that represents video and an audio stream that represents audio, from a transport stream, and supplies these to an encoder/decoder 13 or the like. Hereafter, for the convenience of description, the video stream and audio stream are summarily called an AV stream ST.

Also, the tuner unit 11 separates appended information for data broadcasting such as EPG (Electronic Program Guide) and so forth, copy control information, license information serving as key data for encoding (hereafter these are called program information), from a transport stream TS, and supplies these to the control unit 2.

The encoder/decoder 13 is configured so as to perform compression encoding processing and decompression decoding processing of the video data and audio data according to an encoding method such as MPEG (Motion Pictures Expert Group) or the like.

In an actual arrangement the encoder/decoder 13 decodes each of the video stream and audio stream supplied from the tuner unit 11 into video data and audio data, and supplies these to a video processing unit 14 and audio processing unit 15, respectively.

The video processing unit 14 converts the video data to an analog video signal, for example, further performs predetermined video processing, and sends this to an external television receiver (not shown) or the like. Also, the audio processing unit 15 converts the audio data to an analog audio signal, for example, and sends this to the television receiver or other audio equipment (not shown).

Consequently, the recording/playing device 1 can cause the user to view/listen to the video and audio of the television program via an external television receiver or the like.

An HDD (Hard Disc Drive) 16 has a comparatively large storage capacity such as 500 GB or 1 TB for example, and is configured so as to perform writing and reading of various types of data based on the control of the control unit 2.

The control unit 2 is configured so as to execute recording processing to store a television program on the HDD 16 in the case that the record button on the remote controller 4 is pressed during reception of the television program. Note that even in a case of being at a pre-specified reservation recording point-in-time, the control unit 2 is configured so as to execute similar recording processing (hereafter this is called reservation recording processing).

At this time the control unit 2 stores the AV stream ST extracted from the tuner unit 11 in the HDD 16 as recording processing. Hereafter, the television program stored in the HDD 16 at this time will be called content.

Along with this the control unit 2 is configured so as to generate a feature quantity DS by executing predetermined feature quantity detecting processing as to the AV stream ST and store this in the HDD 16. Now, the feature quantity DS is a value that varies along with the playing time of the content obtained by subjecting the audio data to predetermined analysis processing for example, and is a value representing the degrees of build-up and scene switching in the content (television program). Note that the control unit 2 can generate the feature quantity DS by using a technique disclosed in International Publication WO2006/016605, for example.

Further the control unit 2 generates title information TF made up of information such as a title name included in the program information, genre, performers and the like, and recording date/time for the content (i.e. television program), correlates this to the content and stores this in the HDD 16. Note that the HDD 16 is provided with a content database DBC to store/manage content, title database DBT to store/manage title information TF, and feature quantity database DBS to store/manage feature quantity DS.

Non-volatile memory 17 is made up of EEPROM (Electronically Erasable and Programmable Read Only Memory) or the like, for example, and is configured so as to store various types of programs that the CPU 2A executes, data for encoding processing and decoding processing, and so forth. Note that the non-volatile memory 17 has a comparatively small capacity, but can perform writing/reading of data and the like at a higher speed than the HDD 16.

An optical disk drive 18 is configured so as to be able to write various types of data on a BD (Blu-ray Disc, registered trademark) type optical disk 100 for example, and read out various types of data from the optical disk 100.

A memory card interface (I/F) 19 is configured so as to be able to write various types of data on a memory card 101 that meets the standards of a memory stick (registered trademark) for example, and read out various types of data from the memory card 101.

A network interface 20 is configured so as to be able to communicate with an external device (not shown) via a network such as Ethernet (registered trademark) and exchange various types of data.

The control 2 is also formed so as to be able to mutually move or copy content between external devices connected via the HDD 16, optical disk 100, memory card 101, or network interface 20, according to user operation instructions.

At this time the control unit 2 is configured so as to perform encryption processing and decryption processing in the event of moving or copying copyrighted content with an encryption processing circuit 21.

On the other hand, in the case that a title playing instruction is performed by the user, the control unit 2 reads the AV stream ST of the content represented by the title from the HDD 16 and supplies this to the encoder/decoder 13, as playing processing.

Note that when the playing button on the remote controller 4 is pressed in the state the title is selected on a later-described title display screen or the like and a playing instruction command is generated by the operating unit 5, the control unit 2 determines that a playing instruction has been performed.

Similar to the case of receiving a television program, the encoder/decoder 13 decodes an AV stream ST and generates video data and audio data, and supplies these to the video processing unit 14 and audio processing unit 15, respectively.

The video processing unit 14 converts video data to an analog video signal for example and transmits externally. Also, the audio processing unit 15 converts audio data to an analog audio signal for example and transmits externally. Thus the recording/playing device 1 can cause a user to view/listen to the video and audio of the selected title via an external television receiver (not shown).

Note that the control unit 2 is configured so as to perform similar playing processing even in the case that a title of content stored in the optical disk 100 or memory card 101 is selected and playing instructions performed.

Thus the recording/playing device 1 is configured so as to mutually correlate a television program as content to an AV stream ST, title information TI, and feature quantity DS and stored in the HDD 16, according to user operating instructions.

1-2. Playlist Configuration 1-2-1. Playlist and Clip Configuration

Now, the control unit 2 of the recording/playing device 1 is configured so as to create a playlist for the content and correlated this with the AV stream ST in the event of storing the AV stream ST of the content (television program) in the HDD 16 with the recording processing.

Figure 2:
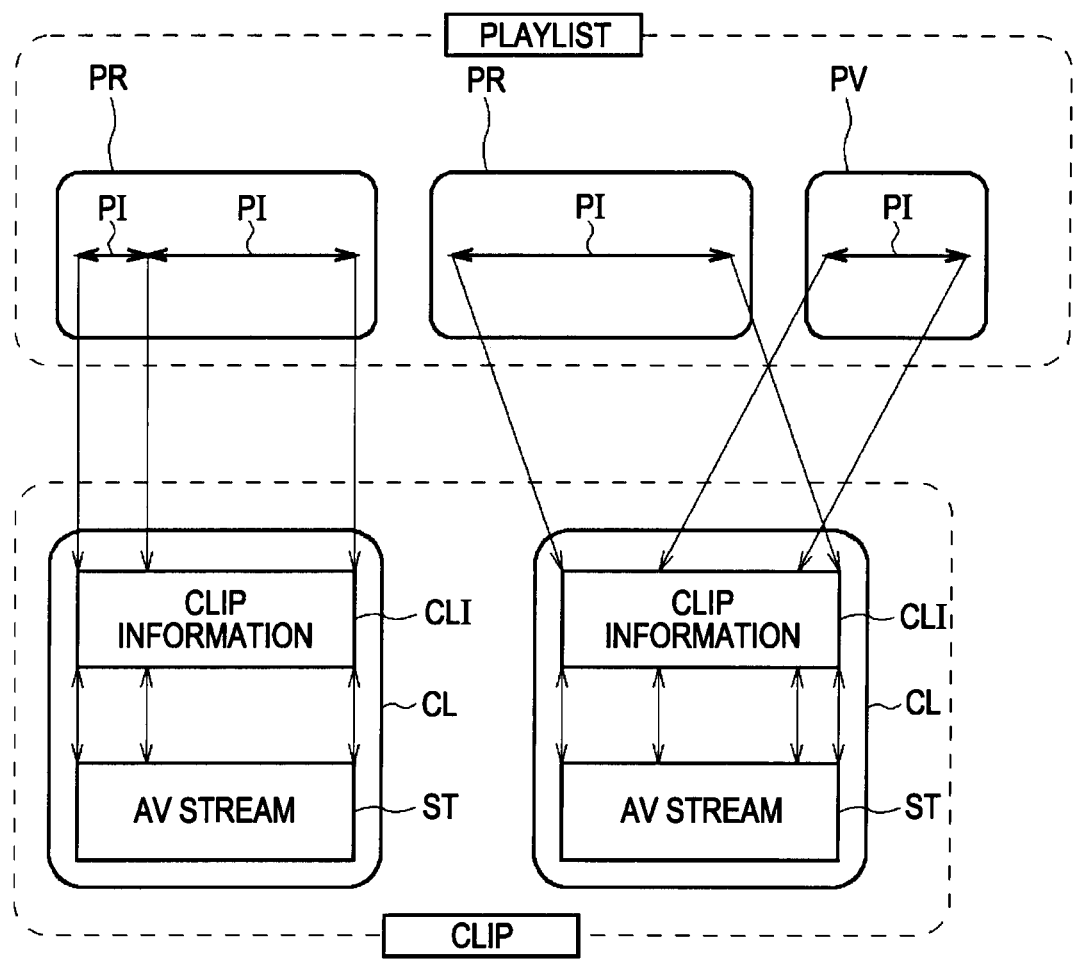
FIG. 2 is an outline diagram showing the relation between a clip, AV stream, and playlist.

FIG. 2 schematically shows the relation between the AV stream ST, clip, and playlist. As shown in FIG. 2, to each AV stream ST is correlated a clip information (Clip Information) CLI that represents information relating to the AV stream ST. Further, the mutually corresponding AV stream ST and clip information CLI are viewed as an integrated object, and make up a clip CL.

On the other hand, the play list specifies a range of a portion or all of the AV stream ST, represents the instruction to play only wanted portions, and can be handled as a content title by the user. That is to say, the playlist is seen by the user as a unit of video and audio that can be expected to continuously perform playing of the content.

The playlist is made up as a collection of play items PI. The play items PI represent a range specified by a playing starting point and playing ending point that each indicate a point-in-time in a certain AV stream ST. The play item PI represents one scene in the content. Therefore in the description below, the play item PI will also be called a scene SC.

Also, there are two types of playlists; a real playlist PR and virtual playlist PV. The real playlist PR corresponds one-to-one with the AV stream, and has a role of managing the AV stream. Therefore, even in the case that a portion or all of the real playlist PR is deleted by editing work or the like, a portion or all corresponding to the AV stream ST is actually deleted.

On the other hand, the virtual playlist PV is correlated to an optional AV stream ST and generated, and is separated from managing each AV stream ST. That is to say, even if the virtual playlist PV is deleted or modified by editing work or the like, the AV stream ST and real playlist RP maintain the status thereof without any modifications. The real playlist PR and virtual playlist PV are each stored/managed in the playlist database DBP provided in the HDD 16.

Note that such relations between the AV stream ST, clip, and playlist are set the same way as with the BD-RE (Rewritable) standards. That is to say, with the recording/playing device 1, the AV stream ST stored in the HDD 16 is managed using a playlist similar to the case of the BD-RE media.

1-2-2. Generating and Editing the Playlist

As described above, the control unit 2 of the recording/playing device 1 stores an AV stream ST (i.e. content) in a content database DBC of the HDD 16 with recording processing.

Figure 3:
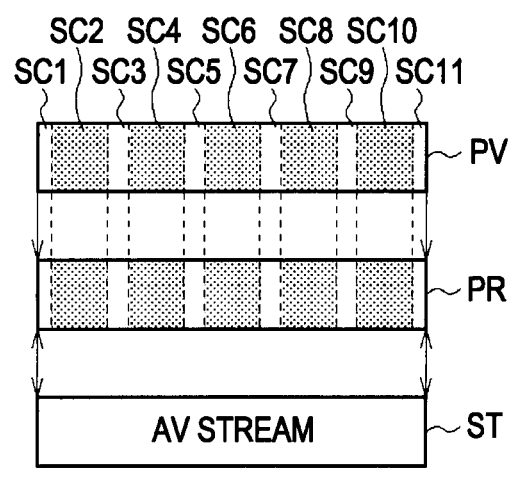
FIG. 3 is an outline diagram to accompany a description of generating a virtual playlist.

At this time the control unit 2 generates a real playlist PR that corresponds to the AV stream ST and stores this in the playlist database DBP of the HDD 16, as shown in FIG. 3. Further the control unit 2 generates a virtual playlist PV together than shows the entire range of the AV stream ST, and stores this in the playlist database DBP of the HDD 16. That is to say, the virtual playlist PV shows the entire range of the AV stream ST, similar to the real playlist PR, at the stage of being generated.

Also, the control unit 2 generates title information TF made up of a title name, generating date/time, updated date/time, playing time and so forth, correlates this to the virtual playlist PV, and stores this in the title database DBT of the HDD 16.

Now, while the control unit 2 handles the virtual playlist PV as a content title and shows this directly to the user, the real playlist PR and AV stream ST are not handled as a title, and are not shown directly to the user. For example, in the case of receiving a title display instruction to display a menu of titles T on the screen via the remote controller 4, the control unit 2 displays the title display screen D1 as shown in FIG. 4 on the external television receiver (not shown).

On the title display screen D1, icons IC1 through IC8 that represent the type of media are arrayed in the horizontal direction, and is in the state of the icon IC 3 representing video content having been selected. Note that the icon IC1 represents a picture (still image) content, and icon IC2 represents music content. Also, icons IC4 and IC5 represent terrestrial digital broadcasting, icon IC6 represents BS digital broadcasting, IC7 represents CS digital broadcasting, and icon IC 8 represents display ending of the title display screen D1.

Further, on the title display screen D1, icons IC11 through IC15 representing each title T are arrayed in the vertical direction above and below the icon IC3, and the icon IC13 is in the state of having been selected by the cursor frame CS1. The icon IC13 corresponds to the title T stored in the title database DBT of the HDD 16, an on the right side of the icon IC13, various types of information based on the title information TF of the title T is displayed as a title label TB1.

Note that a title name TN, date/time DT, and playing time PT are displayed as the title label TB1. This date/time DT represents the date/time that the title T (i.e. the virtual playlist PV) had been generated.

The title display screen D1 is a so-called GUI screen, and is formed so that the media and title icon IC can each be selected by operations of the direction button and determining button and so forth of the remote controller 4.

Now, in the case that editing work of the title T (described in detail later) is performed, the control unit 2 subjects the virtual playlist PV that corresponds to the title T to editing processing according to the editing work.

Figure 5A:
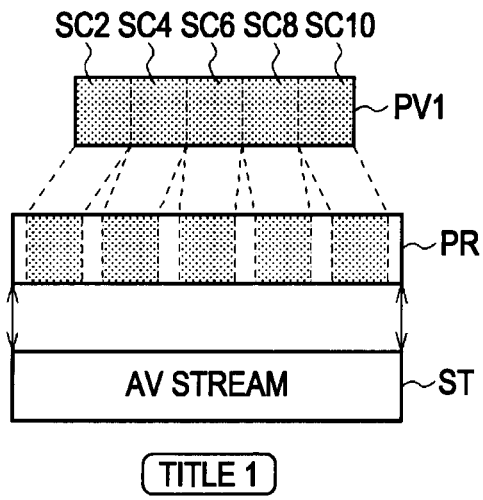
FIGS. 5A and 5B are outline diagrams showing a first relation between the virtual playlist and editing the title.

For example with the editing work of the title T, let us say that of the scenes SC1 through SC11 (FIG. 3) that make up the virtual playlist PV, scenes SC1, SC3, SC5, SC7, SC9, and SC11 are deleted. In this case, as shown in FIG. 5A, a virtual playlist PV1 is generated whereby the remaining scenes SC2, SC4, SC6, SC8, and SC10 are linked. On the other hand, the real playlist PR and AV stream ST are not changed at all.

Therefore, in the case of predetermined restoring processing or the like having been performed, the control unit 2 can add again a scene SC to the virtual playlist PV, that has already been deleted from the virtual playlist PV (to be described in detail later).

Figure 5B:
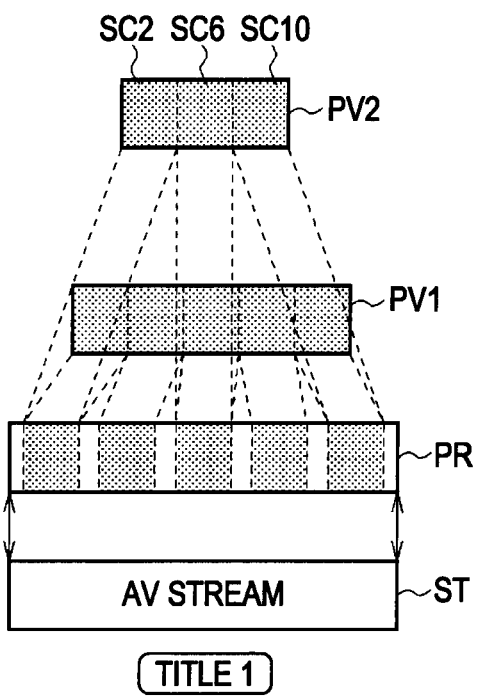

Further, in the case that the scene SC4 and SC8 of the virtual playlist PV1 is deleted with the editing work of the title, a virtual playlist PV 2 is generated whereby the remaining scenes SC2, SC6, and SC10 are linked, as shown in FIG. 5B.

At this time the control unit 2 does not directly update the virtual playlist PV1 as a virtual playlist PV2, but generates a new virtual playlist PV2 while the virtual playlist PV1 remains. Also, the control unit 2 finally corresponds the virtual playlist PV2 with the title T, manages the title T with the title database DBT, and displays the title T on the title display screen D1 (FIG. 4) or the like according to user operations or the like.

However, the control unit 2 does not handle the past virtual playlist PV1 as n independent title T, similar to the real playlist RP or the like, and thereby does not display on the title display screen D1 (FIG. 4).

In other words, while the control unit 2 stores the past virtual playlist PV within as editing history, but presents this to the user as if only the newest virtual playlist PV exists as the title T. Therefore the control unit 2 can perform restoring processing or the like to return the virtual playlist PV2 for example into the virtual playlist PV1 which is the past editing state (details to be described later).

Figure 6:
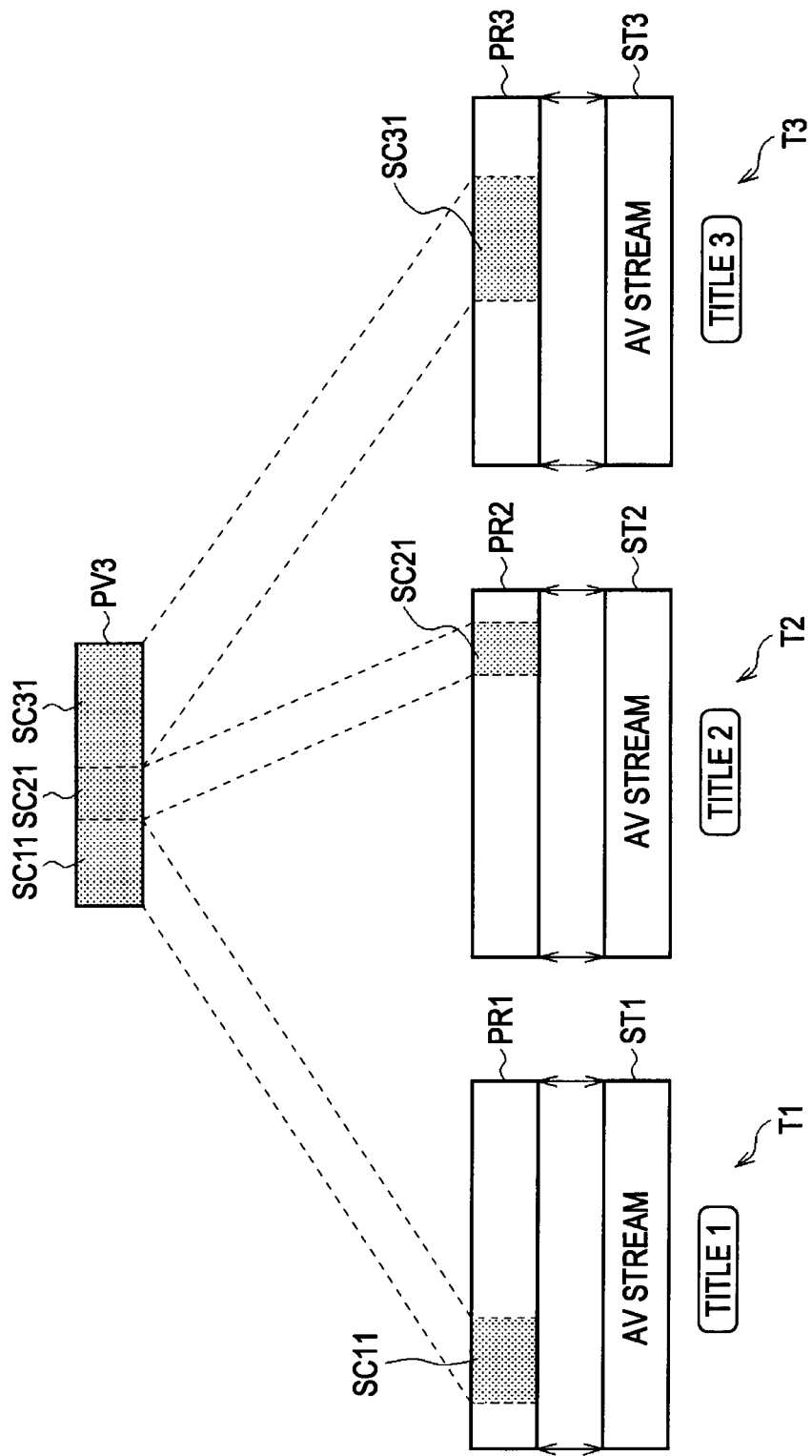
FIG. 6 is an outline diagram showing a second relation between the virtual playlist and editing the title.

Note that the virtual playlist PV can be made up of not only scenes SC in one AV stream ST, but can also combine scenes SC in multiple AV streams ST. For example, as shown in FIG. 6, let us assume that there titles T1, T2, and T3 of which the title names are "Title 1", "Title 2", and "Title 3" respectively, and corresponding to each are AV streams ST1, ST2, and ST3 as well as real playlists PR1, PR2, and PR3. Also, let us say that a portion of the real playlists PR1, PR2, and PR3 are set as scenes SC11, SC21, and SC31.

In this case the control unit 2 can made up a virtual playlist PV3 with predetermined editing work or the like that mutually links the scenes SC11, SC21, and SC31 of the titles T1, T2, and T3.

Figure 7A:
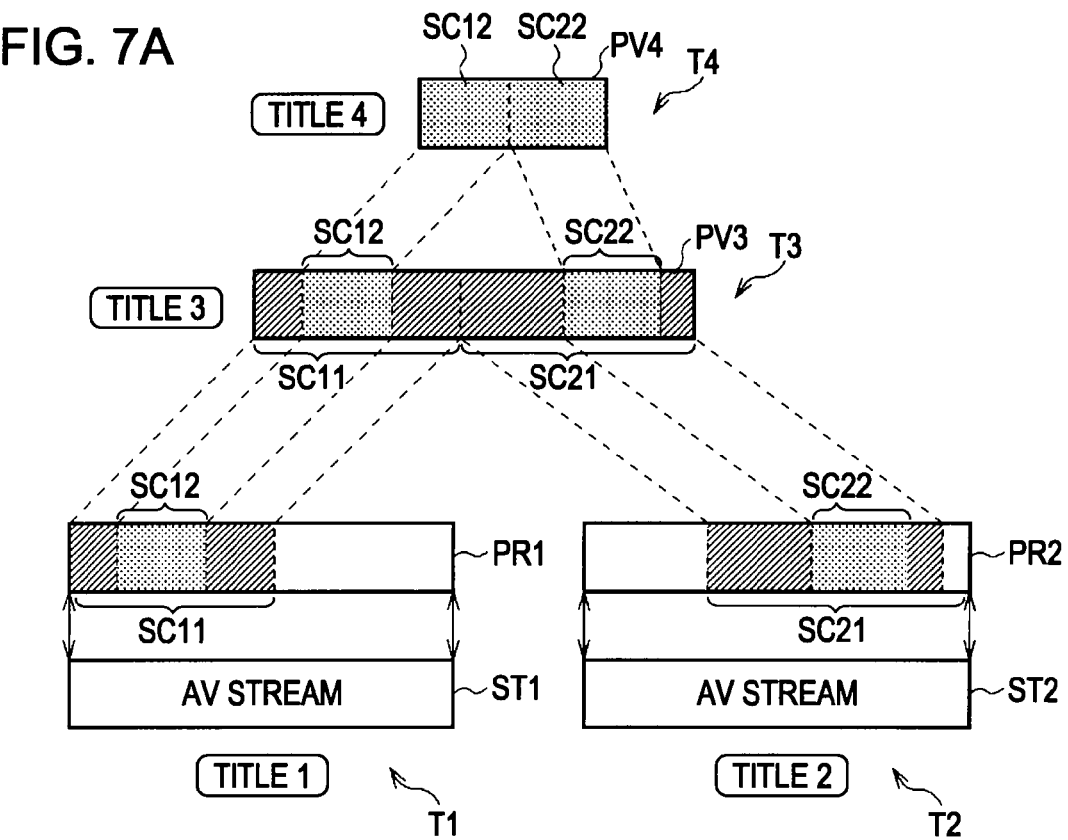
FIGS. 7A and 7B are outline diagrams showing a third relation between the virtual playlist and editing the title.

Also the control unit 2 can generate another virtual playlist PV based on a scene SC of a portion of the virtual playlist PV. For example, as shown in FIG. 7A, by the scenes SC11 and SC12 of the titles T1 and T2 made up of the title names of "title 1" and "title 2" respectively being linked, it can be assumed that a virtual playlist PV3 represented as title T3 has been generated.

Now, let us say that with the editing work and so forth, a scene SC12 which is a portion of the scene SC11 and a scene SC22 which is a portion of the scene SC21 of the title T3 are selected and linked, and a virtual playlist PV4 represented as title T4 is generated.

Figure 7B:
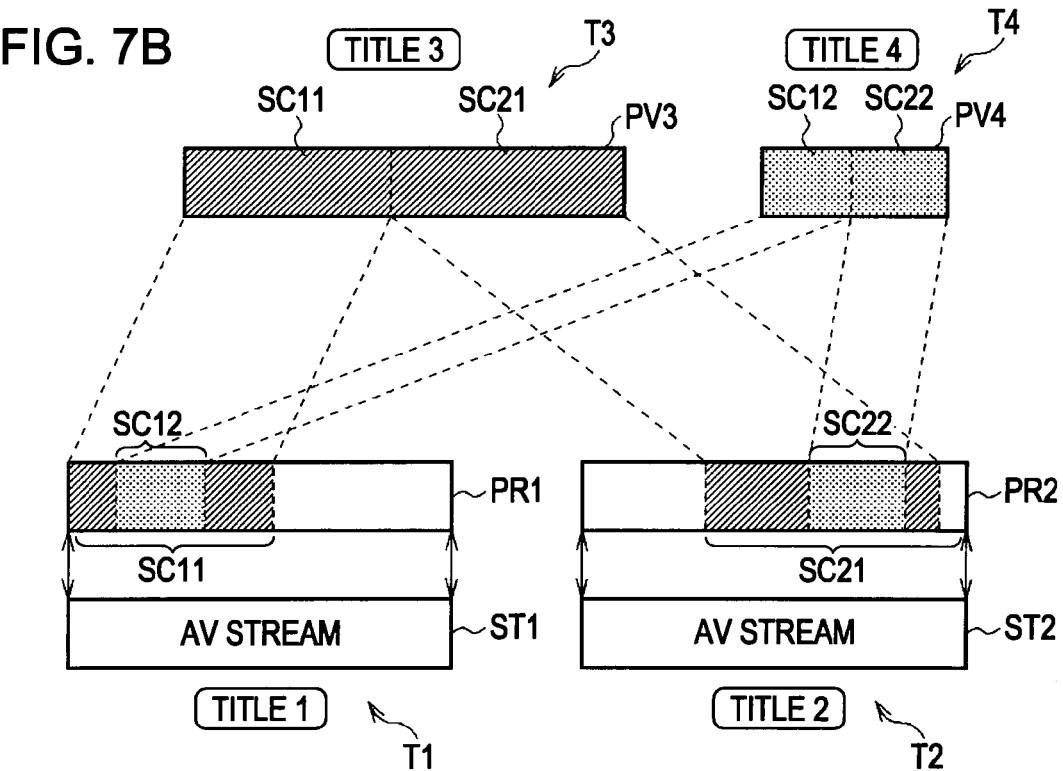

In this case, the scenes SC12 and SC22 of the title T4 correspond respectively, not to the scenes SC12 and SC22 of the virtual playlist PV3, but to the scenes SC12 and SC22 of the real playlists PR1 and PR2, as shown in FIG. 7B.

That is to say, a new virtual playlist PV that has been generated based on an existing virtual playlist PV directly references the scene SC of the real playlist PR, not via the existing virtual playlist PV (not an indirect reference).

Figure 8:
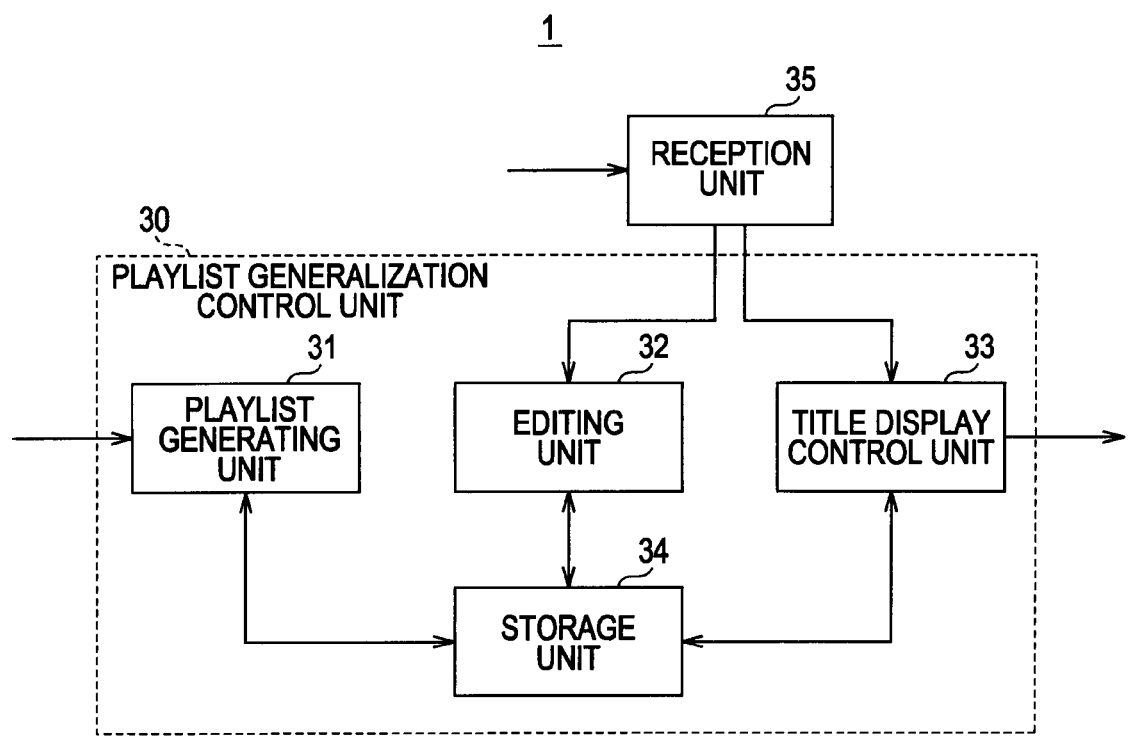
FIG. 8 is an outline block diagram showing a first functional block configuration of a recording/playing device.

Now, FIG. 8 shows a basic functions relating to generating and editing the playlist with the recording/playing device 1 shown in a functional block diagram. In FIG. 8, a central playlist managing unit 30 corresponds to the control unit 2 (FIG. 1), and predetermined program is executed at the control unit 2, whereby functional blocks for each of the playlist generating unit 31, editing unit 32, and title display control unit 33 are realized. Also, a storage unit 34 corresponds to the HDD 16, and a reception unit 35 corresponds to the operating unit 5.

Upon content (AV stream ST) having been supplied, the playlist generating unit 31 generates a real playlist PR and virtual playlist PV corresponding to the content, mutually correlate these, and stores these in the storage unit 34.

Upon receiving editing instructions to edit the content from the user, the reception unit 35 supplies these to the editing unit 32. The editing unit 32 performs editing processing as to the virtual playlist PV based on the editing instructions, and stores this in the storage unit 34 again.

Upon receiving title display instructions to display the content of the title T from the user, the reception unit 35 supplies these to the title display control unit 33. The title display control unit 33 displays the content title T on the television receiver (not shown) or the like, based on the virtual playlist PV that is correlated to the content based on the title display instructions.

Also, when the content to be edited is selected or when the editing processing has been completed and so forth, the title display control unit 33 displays the content title T based on the virtual playlist PV that is correlated to the content, even in the case of presenting the content title to the user.

Thus, the control unit 2 generates the real playlist PR and virtual playlist PV that correspond to the AV stream ST, and edits the virtual playlist PV according to the editing instructions. Also, in the event of editing the virtual playlist PV, the control unit 2 saves the past virtual playlist PV internally as history, while generating a new virtual playlist PV made up of content after editing.

1-3. Generating an Extracted Playlist

Now, by using the above-described feature quantity DS, the control unit 2 can generate a virtual playlist PV of which, in addition to the virtual playlist PV that shows the entire range of the AV stream ST, a portion thereof has been extracted.

Note that for convenience of description, the virtual playlist PV of which a portion of the AV stream ST has been extracted is called an extracted playlist PVS, and the virtual playlist PV that shows the entire range of the AV stream ST is called a full-range playlist PVA.

Processing for the control unit 2 to generate various types of extracted playlists PVS (hereafter this is called automatic extracting processing) will be described below.

1-3-1. Extract from One Title

Figure 9:
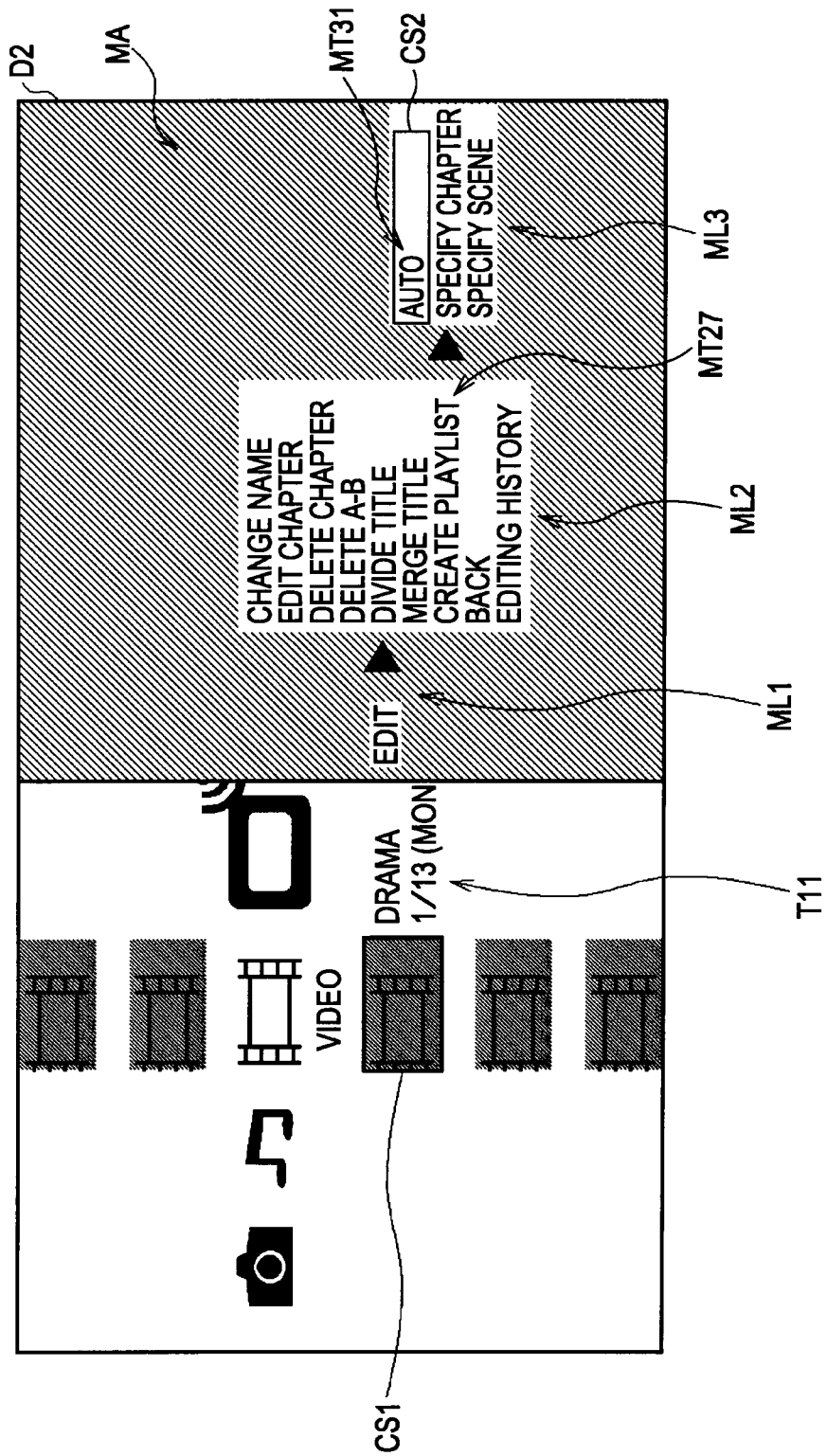
FIG. 9 is an outline diagram showing an instruction screen of automatic extracting processing.

With the title display screen D1 shown in FIG. 4, upon predetermined menu display operations having been performed by the user after the title T1 is selected by the cursor CS1, the control unit 2 displays the menu region MA on the right side of the screen as shown in FIG. 9. Also, upon predetermined operations that follow a menu hierarchy are performed by the user, the control unit 2 sequentially loads and hierarchically displays the menu list ML1, ML2 and ML3 within the menu region MA.

Note that FIG. 9 shows a virtual playlist PV made up of a full-region playlist PVA with the title name "Drama episode 1" being displayed as a title T11, and shows the state of being selected by the cursor CS1.

Multiple menu items MT including the menu item MT31 displayed as "auto" is displayed in the menu list ML3. Note that in the case that the feature quantity DS for the content selected by the cursor CS1 at this time (i.e. the title T11) has not been generated, the menu item MT 31 is not displayed and so is not available to be selected.

Figure 10:
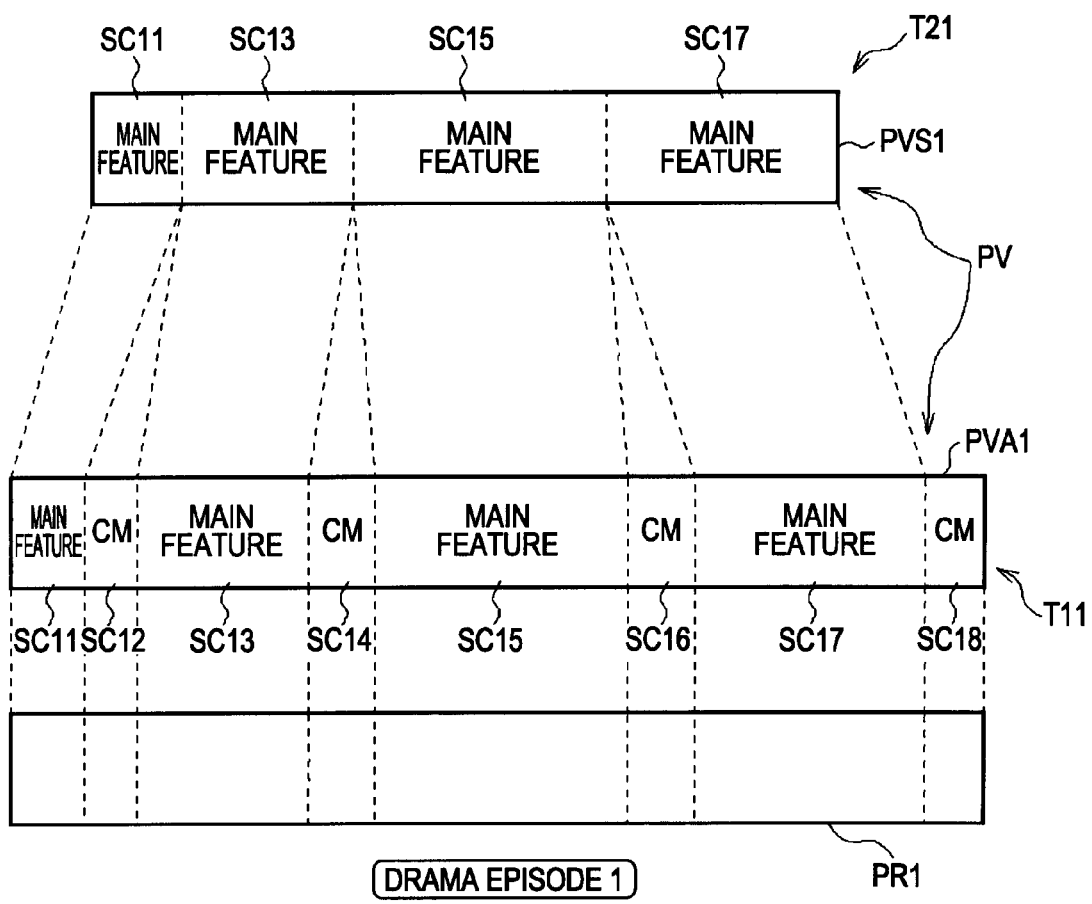
FIG. 10 is an outline diagram showing a first configuration of an extracted playlist.

Next, upon the menu item MT 31 having been selected, the control unit 2 divides the real playlist PR1 into the main feature scenes SC11, SC13, SC15, and SC17 and commercial (CM) scenes SC12, SC14, SC16, and SC18 based on the feature quantities DS as shown in FIG. 10.

Following this, the control unit 2 extracts the main feature scenes SC11, SC13, SC15, and SC17 and generates a linked extracted playlist PVS1. The extracted playlist PVS1 is generated separately from the full-range playlist PVA that corresponds with the real playlist PR1.

Also, the control unit 2 generates a title information TF corresponding to the extracted playlist PVS1 as a title T2 and stores this in the title database DBT.

Figure 11:
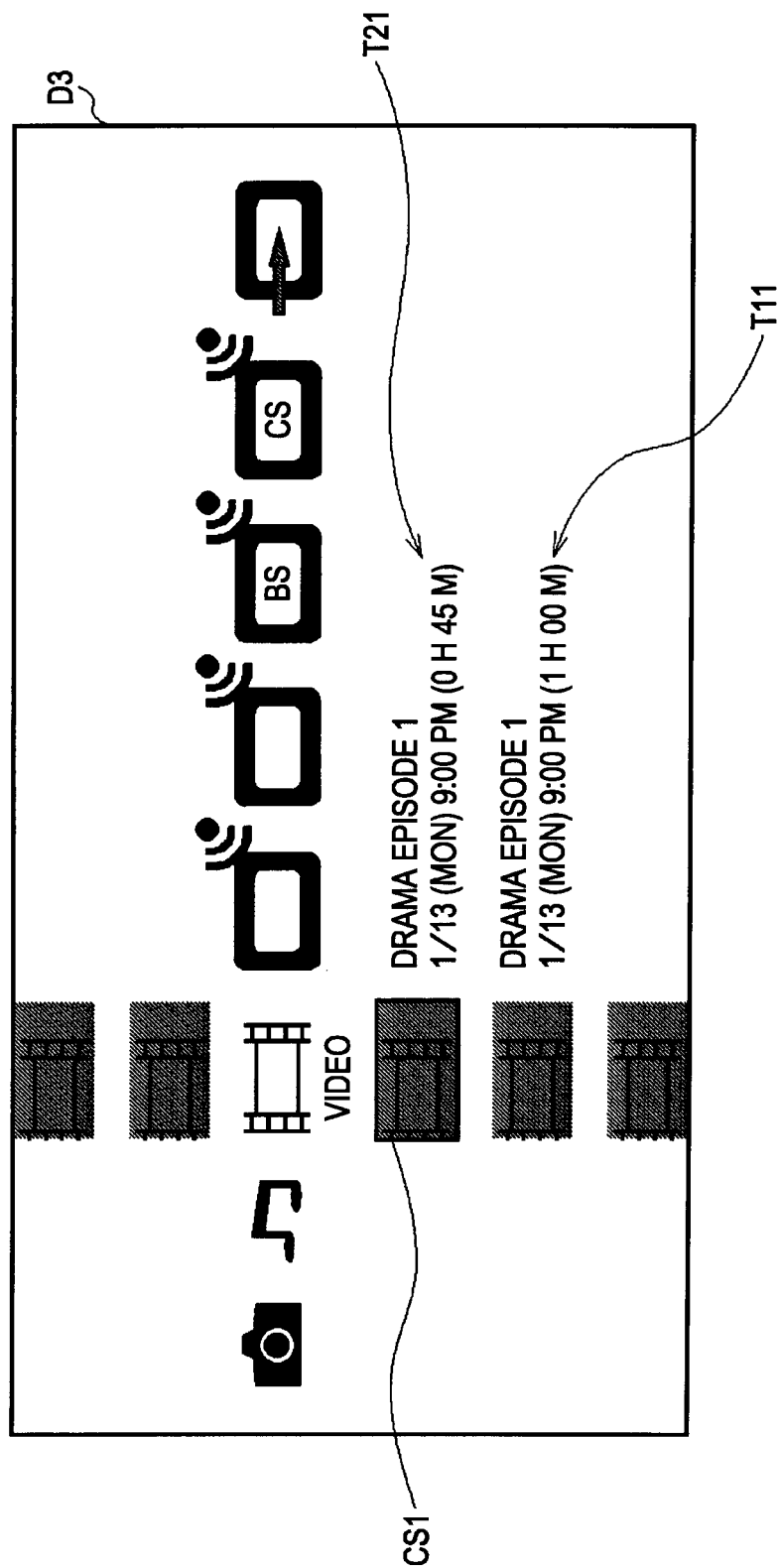
FIG. 11 is an outline diagram showing a title display screen after automatic extracting processing.

Subsequently, at the point in time of generating the extracted playlist PVS1 having been completed, or when title display instructions are received from the user, in the case of presenting the content title to the user, the control unit 2 displays the title display screen D3 as shown in FIG. 11 which corresponds to FIG. 9.

On the title display screen D3, for the title name "Drama episode 1", in addition to the title T1 which represents the full-range playlist PVA, the title T2 representing the extracting playlist PVS1 is displayed. Note that for the title T2, the same title name TN and recording date/time DT are shown the same as for the title T1, but the playing time PT is shown to be shorter than that of the title T1.

Thus, upon the menu item MT31 (FIG. 9) having been selected, the control unit 2 can generate the extracted playlist PVS1 wherein only the main feature is extracted from one title T1 and presented to the user as an independent title T2.

1-3-2. Extracting from Multiple Titles

Figure 12:
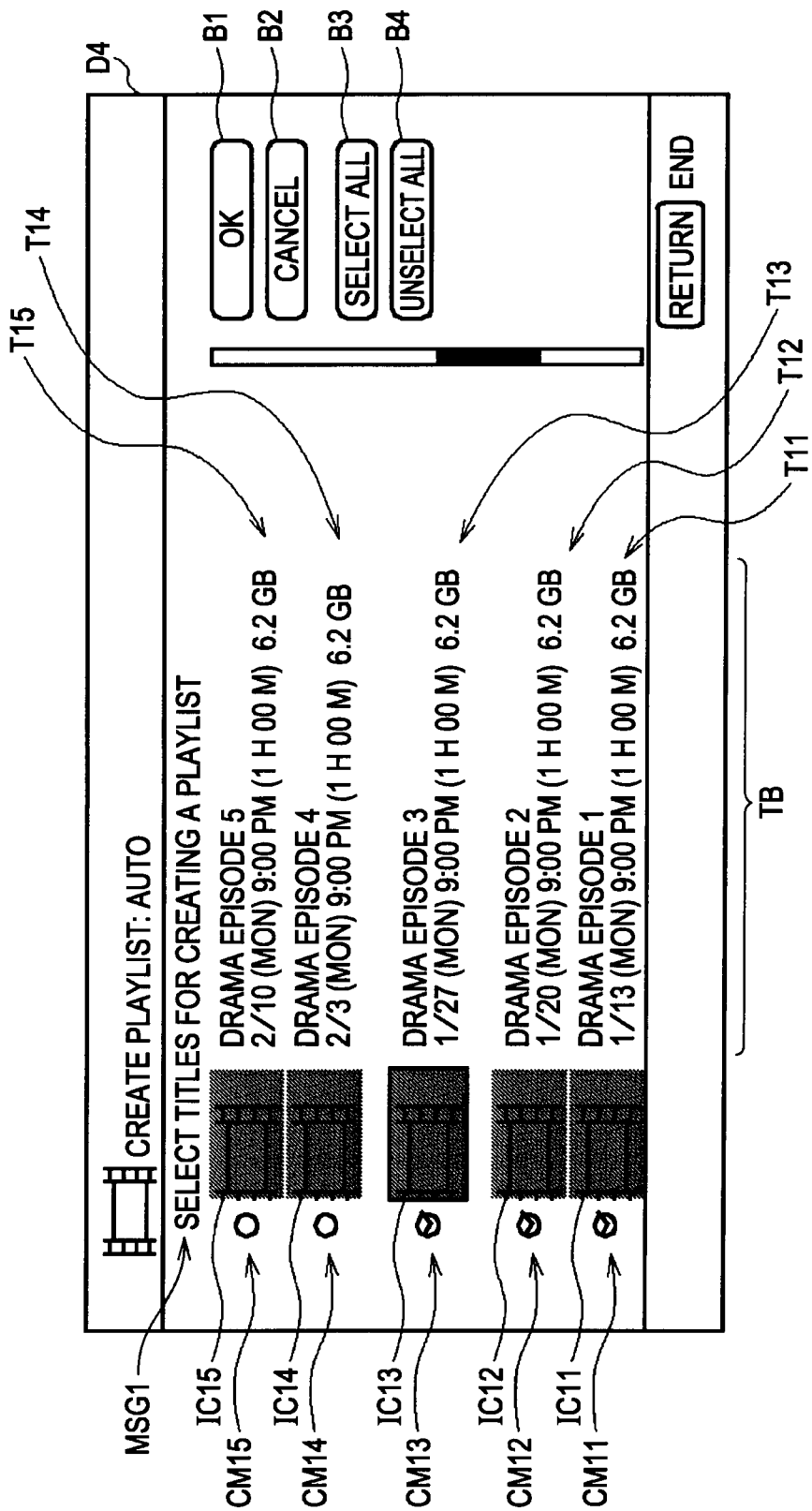
FIG. 12 is an outline diagram showing a title selection screen.

Upon the menu item MT31 having been selected in the instruction screen D2 (FIG. 9) of the extracting processing and further predetermined operating instructions having been performed, the control unit 2 displays the title selection screen D4 shown in FIG. 12, and presents multiple titles T to the user who is prompted to make a selection.

The title selection screen D4 is a GUI screen similar to the title display screen D1, has a message MSG1 displayed on the upper portion of the screen such as "please select the title to create a playlist", and prompts the user to select the title T.

On the left portion of the title selection screen D4, icons IC11 through IC15 representing the titles T are arrayed vertically, and on the right side of the icons IC11 through IC15 are displayed title labels TB based on the title information TF of the titles T11 through T15, respectively. Also, on the left side of each icon IC11 through IC15 is displayed a check box CM11 through CM15 that displays whether or not each title T11 through T15 has been selected.

By causing the user to move the cursor CS1 up and down and pressing the selection button on the remote controller 4 in the state of instructing the title T on the title selection screen D4, the control unit 2 selects or deselects each title T.

Also, on the right portion of the title selection screen D4, a confirming button B1 to confirm the specifying of the titles T, a stopping button B2 to stop selecting the titles T, a select all button B3 to select all of the titles T, and a deselect all button B4 to deselect all of the selections are arrayed in the vertical direction.

Upon the confirming button B1 having been pressed/operated in the state of two or more titles T having been selected, the control unit 2 starts generating the extracted playlist PVS. Here, as shown in FIG. 12, we assume that the three titles of titles T11 through T13 are selected.

Figure 13:
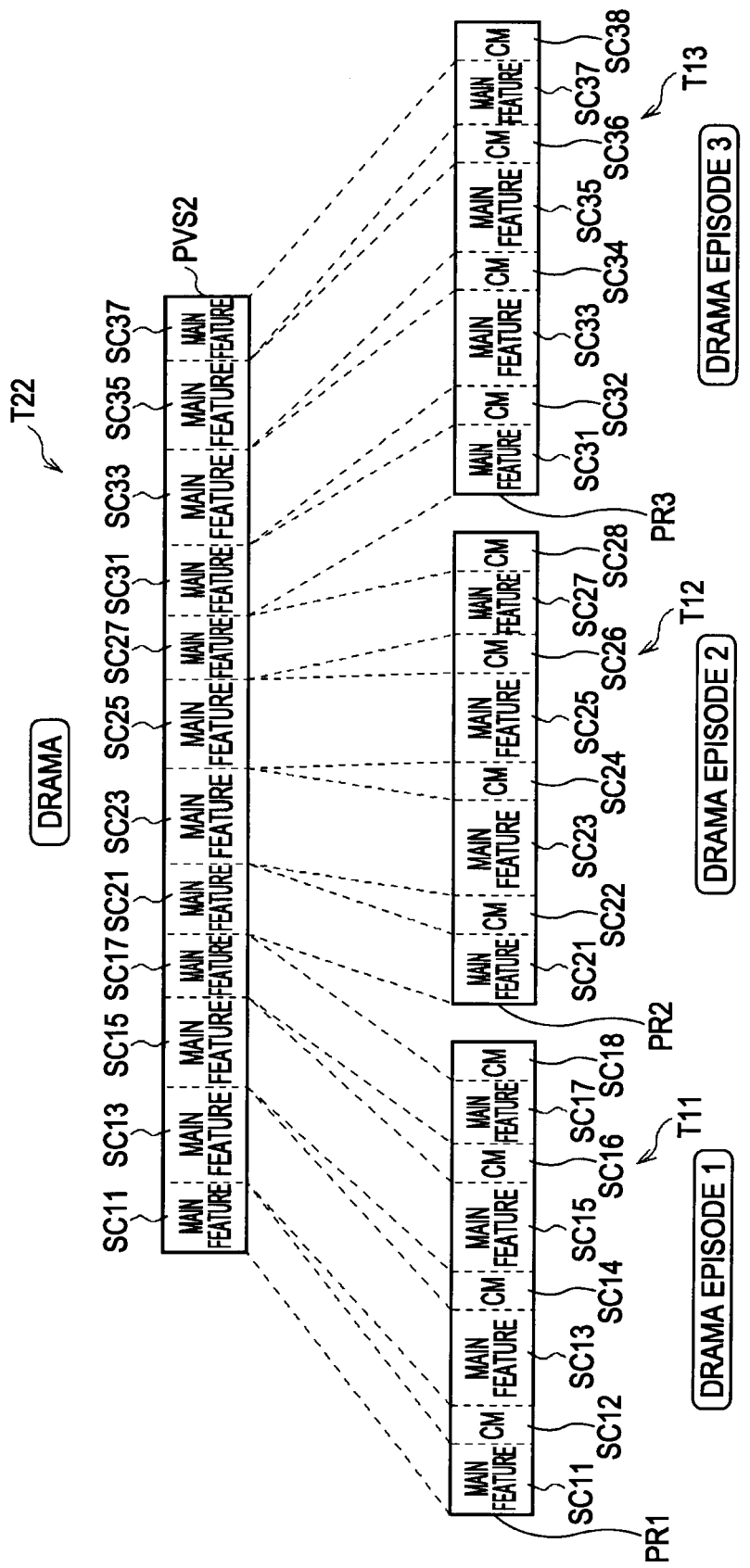
FIG. 13 is an outline diagram showing a second configuration of an extracted playlist.

First, as shown in FIG. 13, the control unit 2 separates and divides the real playlist PR into main feature scenes SC and commercial (CM) scenes SC, based on each feature quantity DS, for each title T.

Specifically, the real playlist PR1 is divided into the main feature scenes SC11, SC13, SC15, and SC17, and the commercial scenes SC12, SC14, SC16, and SC18. Also, the real playlist PR2 is divided into the main feature scenes SC21, SC23, SC25, and SC27, and the commercial scenes SC22, SC24, SC26, and SC28. Further, the real playlist PR3 is divided into the main feature scenes SC31, SC33, SC35, and SC37, and the commercial scenes SC32, SC34, SC36, and SC38.

Next, the control unit 2 extracts and links only the main feature scenes SC of each title T, thereby generating a new extracted playlist PVS2. That is to say, the extracted playlist PVS2 becomes a virtual playlist PV wherein the main feature scenes SC11, SC13, SC15, SC17, SC21, SC23, SC25, SC27, SC31, SC33, SC35, and SC37 are sequentially linked. Also, the control unit 2 generates title information TF corresponding to the extracted playlist PVS2 as a title T22, and stores this in the title database DBT.

Figure 14:
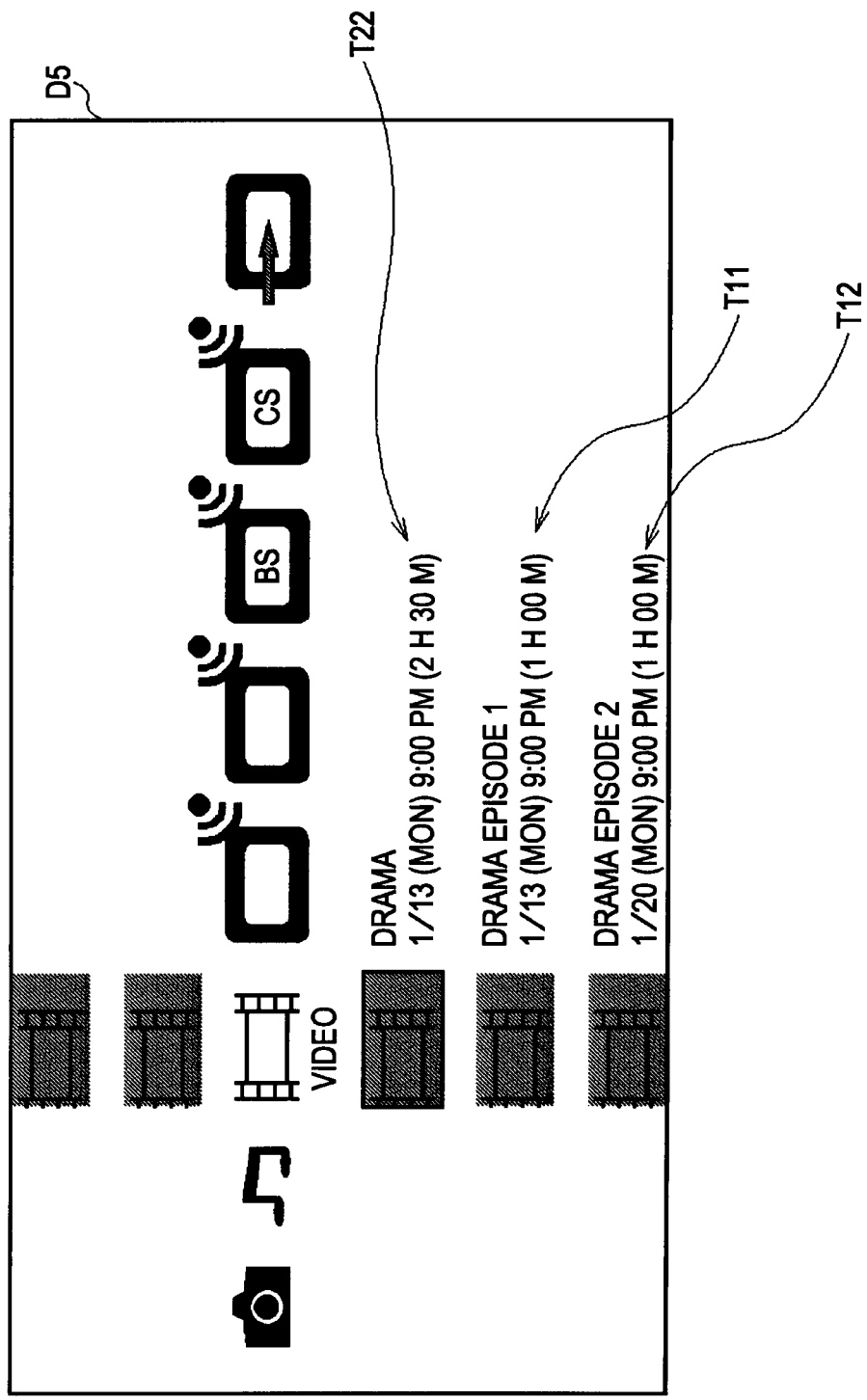
FIG. 14 is an outline diagram showing a second title display screen after automatic extracting processing.

Consequently, as shown in FIG. 14 which corresponds to FIG. 11, on the title display screen D5 that presents the content titles to the user, a title T22 representing the extracted playlist PVS2 is displayed in addition to the titles T11 and T12 that represent the full-range playlist PVA.

Note that the title name TN that is shared among titles T11 through T13, the first recording date/time DT of the titles T11 through T13, and the playing time PT which is the total time for main feature scenes SC, are shown for the title T22. Note that the title name TN may be arbitrarily specified by the user, and the recording date/time DT may represent the date and time of extracting processing.

Thus, upon multiple titles T being selected in the extracting processing, the control unit 2 generates an extracted playlist PVS that extracts and links only the main feature from the selected titles T, and presents this to the user as an independent title T on the title display screen and the like.

1-3-3. Extracting by Genre

Also, in the event that settings are performed for reservation recording to perform recording processing of a television program at a specified point-in-time, the control unit 2 is configured so as to be able to receive settings such that an extracted playlist PVS is generated along with the recorded processing (hereafter this is called reservation extracting setting).

On the other hand, the control unit 2 sets various extracting patterns such as how to divide the scenes SC from the feature quantity DS and how to extract the scenes SC, for each television program genre (sports, news, drama, music, and so forth).

In the case that a reservation extracting setting is made while the reservation recording is set for television program, the control unit 2 performs extracting processing of the television program (i.e. content) at the point in time of the broadcast and the point in time of the television program recorded having been completed.

At this time the control unit 2 identifies the television program (content) genre, based on the program information of the television program, and performs content extracting processing according to the extracting pattern according to the genre. For example in the case that the television program (title T15) genre is "sports", the control unit 2 distinguishes the highlight (climaxing) scenes SC and other scenes SC, according to the extracting pattern for the genre "sports".

Figure 15:
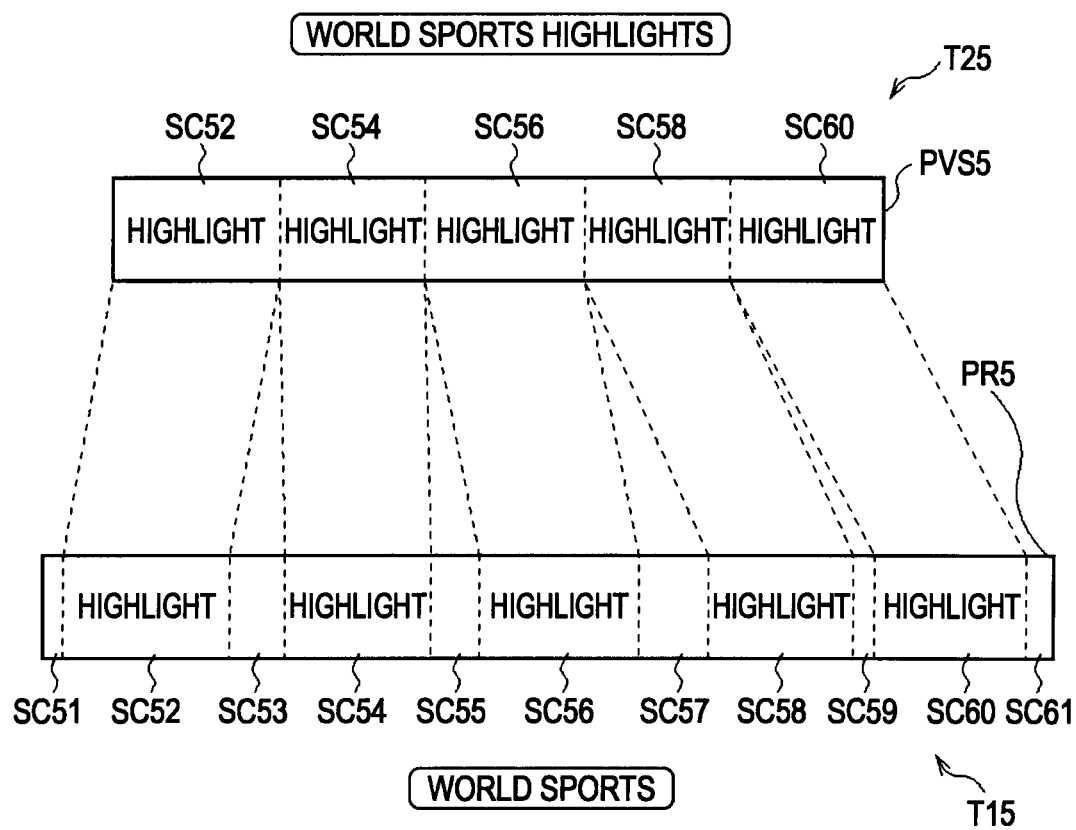
FIG. 15 is an outline diagram showing a third configuration of an extracted playlist.

Specifically, as shown in FIG. 15, the control unit 2 distinguishes the highlight scenes SC52, SC54, SC56, SC58, and SC60 and the other scenes SC51, SC53, SC55, SC57, SC59, and SC61 of the real playlist RP4 of the title T15. Note that for the title 15, a virtual playlist PV corresponding to the real playlist RP4 (i.e. a full-range playlist PVA4) is also generated, but this is omitted in FIG. 15.

Next, the control unit 2 generates an extracted playlist PVS5 by extracting and linking only the highlight scenes SC of the title T15 (title name "world sports"). Also, the control unit 2 generates title information TF with the title name as "world sports highlights" corresponding to the extracted playlist PVS5, stores this in the title database DBT as an independent title T25, and completes the extracting processing.

Figure 16:
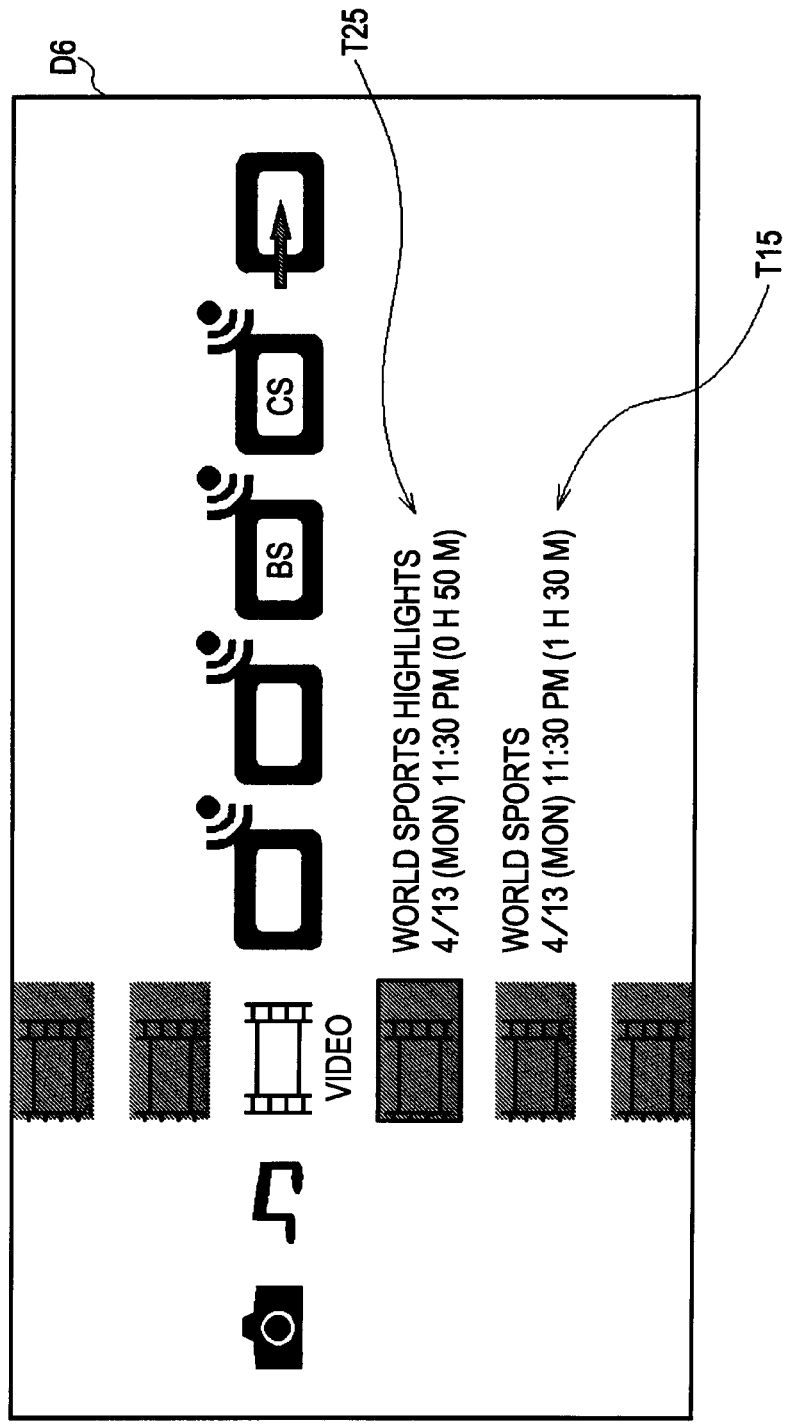
FIG. 16 is an outline diagram showing a third title display screen after automatic extracting processing.

Subsequently, in the case of receiving instructions to display the content title, the control unit 2 displays the title display screen D6 such as shown in FIG. 16. On the title display screen D6, the title T15 corresponding to the full-range playlist PVA4 is displayed, while the title T25 corresponding to the extracting playlist PVS5 is displayed.

Thus, in the case that reservation extracting settings are made along with the recording reservation, the control unit 2 generates the extracted playlist PVS according to the extracting pattern according to the television program genre, in addition to the full-range playlist PVA of the television program.

1-3-4. Functional Block Configuration when Generating Playlist

Figure 17:
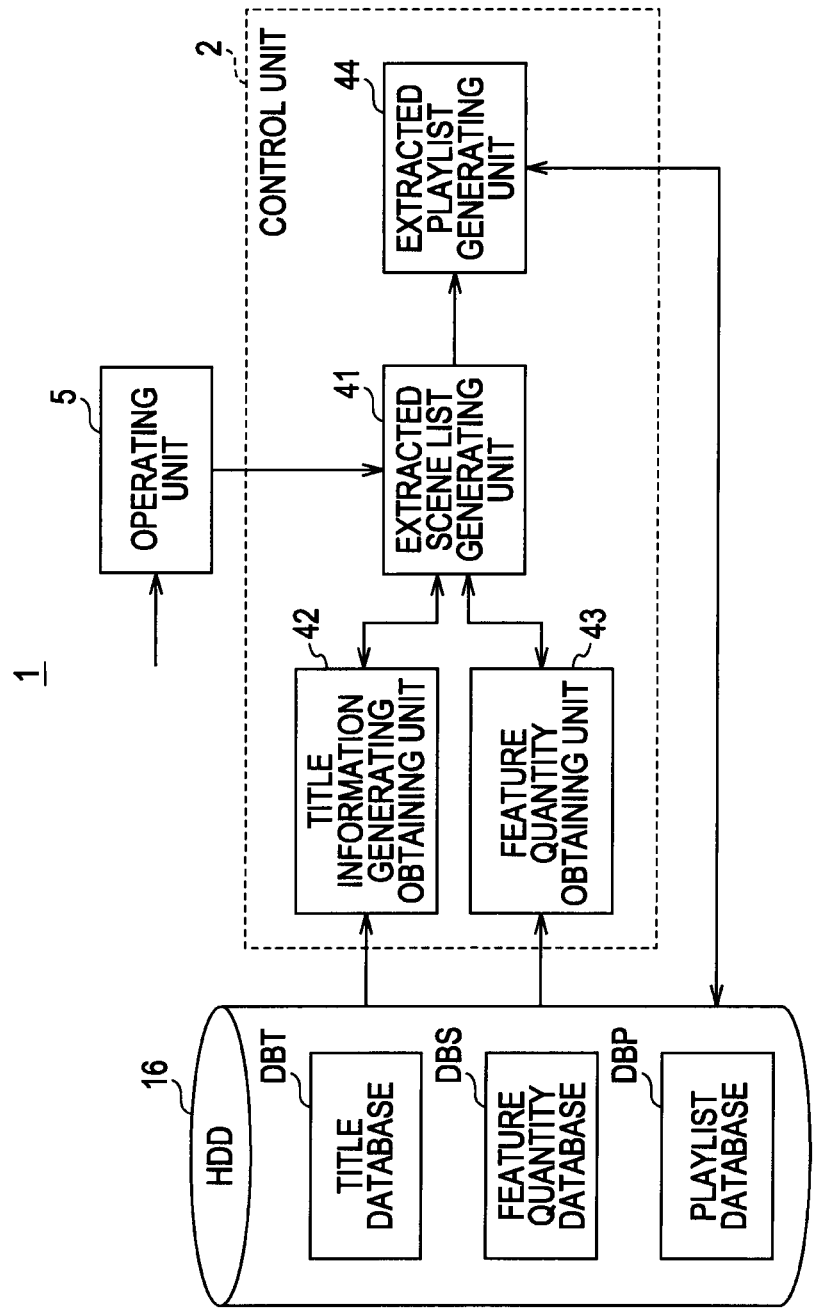
FIG. 17 is an outline block diagram showing a second functional block configuration of the recording playing device.

Now, a functional block configuration is shown in FIG. 17 in the event of the control unit 2 of the recording/playing device 1 generating an extracted playlist PVS. By the predetermined extracted playlist generating program or the like being executed, the control unit 2 makes of various functional blocks internally such as an extracted scene list generating unit 41, title information generating obtaining unit 42, feature quantity obtaining unit 43, and extracted playlist generating unit 44.

A title database DBT, feature quantity database DBS, and playlist database DBP are provided within the HDD 16.

Upon receiving generating instructions for the extracted playlist PVS from the user, the operating unit 5 supplies this to the extracted scene list generating unit 41. The extracted scene list generating unit 41 reads out the title information TF relating to the title T according to the generating instructions from the title database DBT of the HDD 16 with the title information generating obtaining unit 42. Also, the extracted scene list generating unit 41 reads out the feature quantity DS of the selected title T from the feature quantity database DBS of the HDD 16, by way of the feature quantity obtaining unit 43.

The extracted scene list generating unit 41 distinguishes the selected title T into multiple scenes SC based on the title information TF and the feature quantity DS, while generated an extracted scene list that lists the scenes SC to be extracted, and supplies this to the extracted playlist generating unit 44.

The extracted playlist generating unit 44 generates an extracted playlist PVS linking the scenes SC to be extracted, based on the extracted scene list, and stores this in the playlist database DBP of the HDD 16. Also, the title information generating obtaining unit 42 generates a new title T that corresponds to the extracted playlist PVS, and stores this in the title database DBT of the HDD 16. Note that the real playlist PR and AV stream ST at this time are not available to be modified at all.

However, with the various internal functional blocks, the control unit 2 can generate an extracted playlist PVS according to generating instructions and store this in the HDD 16 as an independent title T.

1-3-5. Extracted Playlist Generating Processing Sequence

Figure 18:
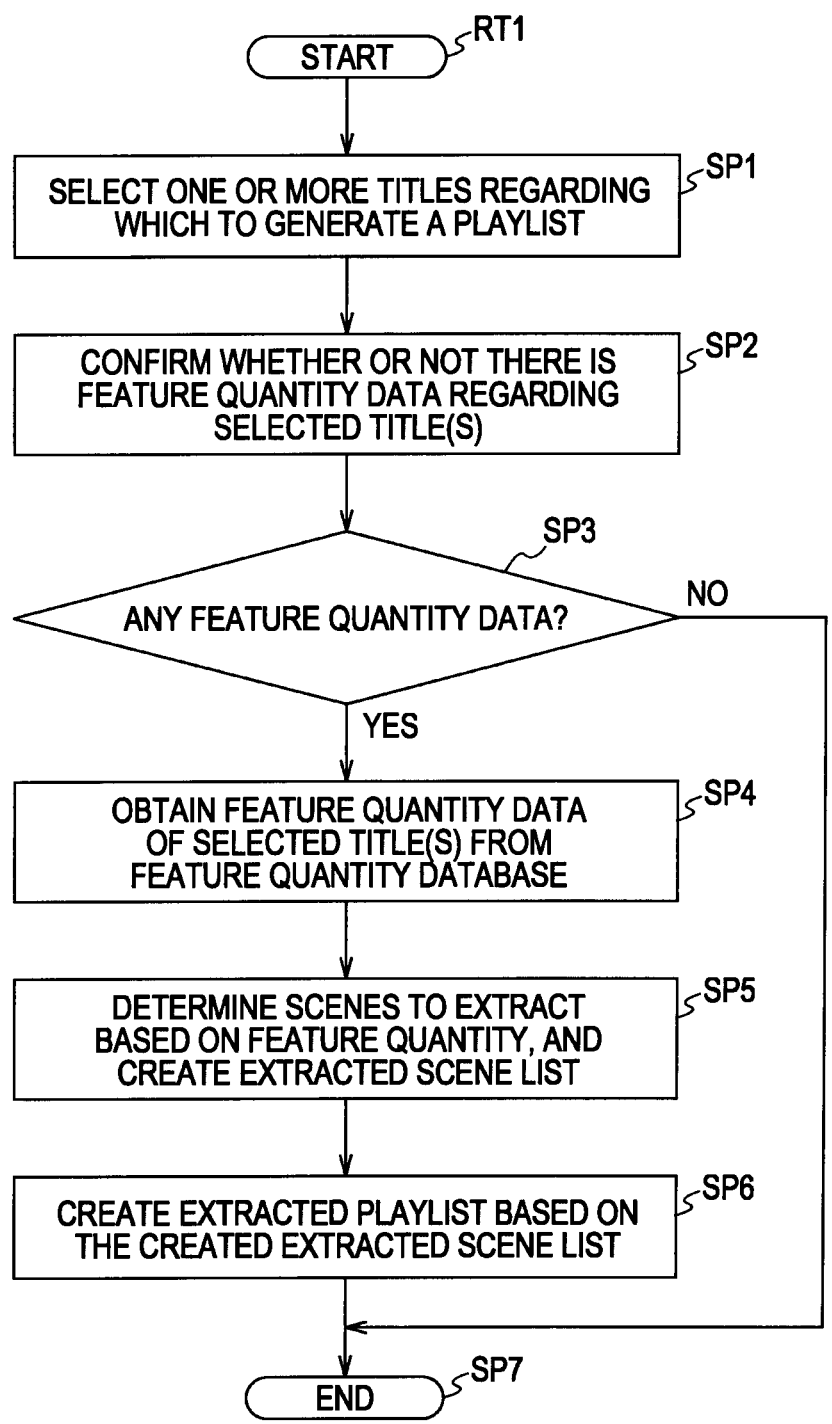
FIG. 18 is a flow chart showing extracted playlist generating processing procedures.

Next, the extracted playlist generating processing sequence RT1 in the event of the control unit 2 generating the extracted playlist PVS will be described according to the flowchart in FIG. 18.

Upon the menu item MT 31 having been selected on the instruction screen D2 (FIG. 9) of the extracting processing, or upon the reservation recording processing subjected to reservation extracting setting having been completed, the control unit 2 starts the extracted playlist generating processing sequence RT1 and transitions to step SP1.

In step SP1 the control unit 2 selects one or two or more titles T according to the user operating instructions, or viewing this as the title T of the content generated by the reservation recording processing having been selected, transitions to the next step SP2.

The control unit 2 in step SP2 confirms whether or not the feature quantity DS for the selected title T is stored in the feature quantity database DBS of the HDD 16 (FIG. 1), and transitions to step SP3.

In step SP3 the control unit 2 determines whether or not there is any feature quantity DS for the selected title T. Now, when positive results are obtained, this indicates that the extracted playlist PVS can be generated based on the title T, and the control unit 2 at this time transitions to step SP4.

In step SP4, the control unit 2 reads out the feature quantity DS of the selected title T from the feature quantity database DBS of the HDD 16, and transitions to the next step SP5. Note that in the case that multiple titles T have been selected, the control unit 2 reads out the feature quantity DS for each of all titles T.

In step SP5, the control unit 2 distinguishes the real playlist PR of the selected title T into multiple scenes SC, based on the read out feature quantity DS, while generating an extracted scene list that lists the scenes SC to be extracted, and transitions to the next step SP6. Note that in the case that multiple titles T are selected, the control unit 2 summarizes the scenes SC to be extracted for each title T into one extracted scene list.

In step SP6 the control unit 2 generates the extracted playlist PVS based on the generated extracted scene list, correlates this to a new title T and stores this in the HDD 16, then transitions to the next step SP7 and ends the extracted playlist generating processing procedures RT1.

On the other hand, if negative results are obtained in step SP3, this indicates that there is no feature quantity DS for the selected title T, whereby scene SC extraction is no performed and an extracted playlist PVS is not generated. At this time the control unit 2 displays a predetermined error message and so forth, then transitions to step SP7 and ends the extracted playlist generating processing procedures RT1.

1-4. Playlist Playing Processing Procedures

Figure 19:
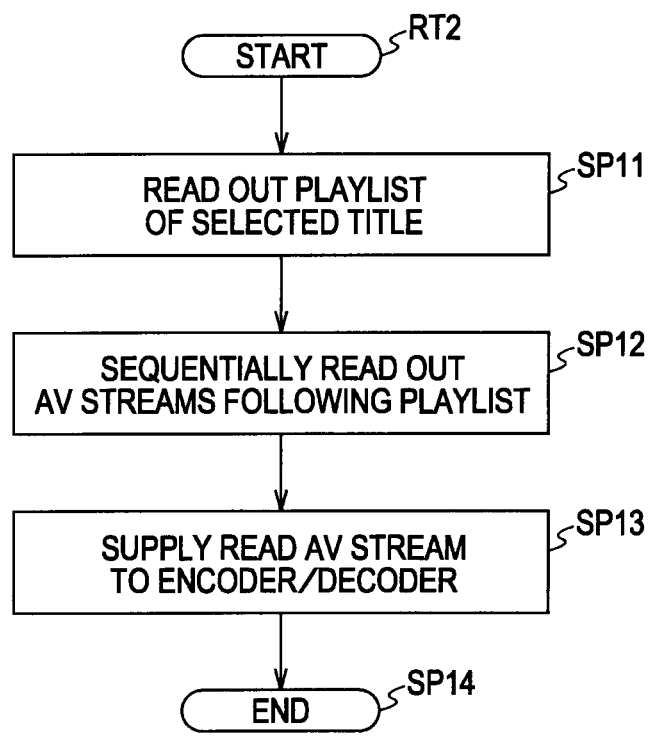
FIG. 19 is a flowchart showing playlist playing processing procedures.

Next, the playlist playing processing procedures RT2 in the event of playing a playlist selected as the title T by the control unit 2 (i.e. a virtual playlist PV, full-range playlist PVA, or extracted playlist PVS) will be described according to the flowchart in FIG. 19.

Upon receiving playing instructions by a pressing operation or the like of the playing button on the remote controller 4 in the state of the title T having been selected on the title display screen D1 (FIG. 4) or the like, the control unit 2 starts the playlist playing processing procedures RT2, and transitions to step SP1.

In step SP1 the control unit 2 reads out the playlist correlated to the selected title T from the playlist database DBP in the HDD 16 (FIG. 1), and transitions to step SP12.

In step SP12 the control unit 2 sequentially reads out the applicable scene SC of the corresponding AV stream ST from the content database DBC of the HDD 16 according to the read out playlist, and transitions to the next step SP13.

In step SP13 the control unit 2 sequentially supplies the read out AV stream ST to the encoder/decoder 13 (FIG. 1) and decrypts this and so forth, then supplies this to the video processing unit 14. Thus, the control unit 2 causes the user to view/listen to the video and audio based on the selected playlist via the television receiver (not shown) or the like, transitions to the next step SP14, and ends the playlist playing processing procedures RT2.

1-5. Editing Processing

Note that the control unit 2 of the recording/playing device 1 is configured so as to enable editing work of the title T based on operating instructions of the user.

As specific editing work, there is dividing processing to divide the title T (actually the newest virtual playlist PV) into multiple scenes SC, joining processing to join the various scenes SC, deleting processing to delete a portion of scenes SC or titles T, and so forth.

Also, as described above, the control unit 2 does not allow the user to recognize a past virtual playlist PV as an independent title T, but stores this in the playlist database DBP within the HDD 16. Such a past virtual playlist PV can be said to express the past editing state relating to the title T which is correlated to the newest virtual playlist PV.

Thus, by using the past virtual playlist PV, the control unit 2 can also perform restoring processing to return the title T to the previous editing state, or recovery processing to recover a deleted title T.

Hereafter we assume that the title T shown in the title display screen D1 (FIG. 4) (title name: "Title 1", playing time: 1 hour) has been correlated to the virtual playlist PV71 shown schematically in FIG. 20. Also, the editing state shown with the virtual playlist PV71 is called an editing state 1.

With predetermined editing work, the title 1 is in editing state 2 with a playing time of 55 minutes, then passes through an editing state 3 wherein the playing time is 50 minutes and an editing state 4 wherein the playing time is 40 minutes, and finally is in an editing state 5 wherein the playing time is 30 minutes. Also, let us say that the editing states 2, 3, 4, and 5, and the virtual playlists PV72, PV73, PV74, and PV75 corresponding thereto respectively are sequentially generated.

Consequently, the title label TB (playing time: 30 minutes or the like) based on the newest virtual playlist PV75 is displayed for the title T1 on the title display screen D7 (FIG. 21) that presents the title T of the content after the editing work.

1-5-1. Immediately Previous Restoring Processing (1)

Figure 21:
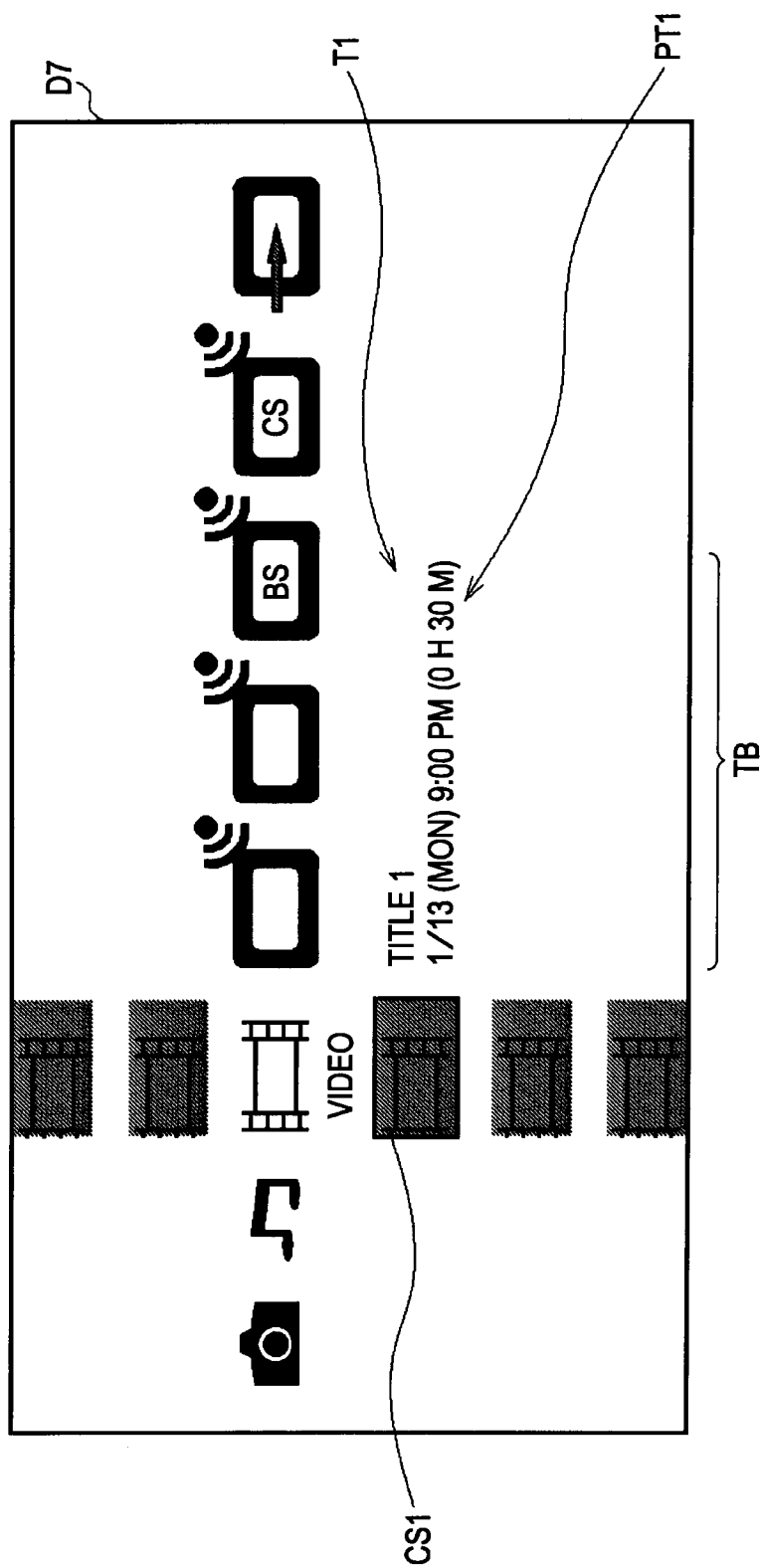
FIG. 21 is an outline diagram showing a title display screen before restoring processing.
Figure 22:
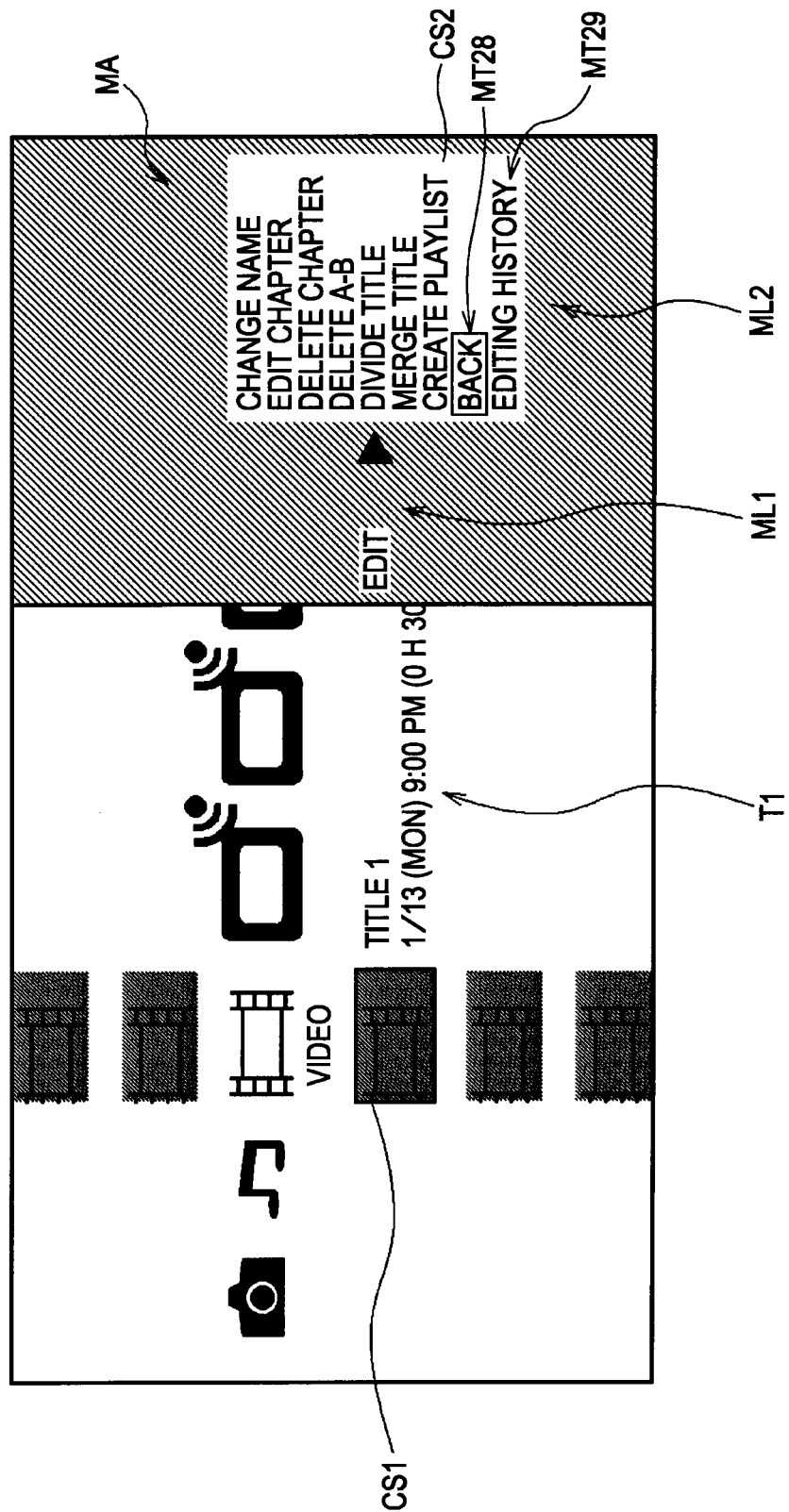
FIG. 22 is an outline diagram showing an instruction screen of the restoring processing.

Upon predetermined menu display operations having been performed by the user while the title T1 is selected by the cursor CS1 on the title display screen D7 (FIG. 21), the control unit 2 displays a menu region MA on the right side of the screen as shown in FIG. 22. Also, upon predetermined operations having been performed by the user to follow the menu hierarchy, the control unit 2 sequentially loads the menu lists ML1 and ML2 within the menu region MA and displays these hierarchically.

Multiple menu items MT are displayed in the menu list ML2, including a menu item MT28 displayed as "return to one prior" and a menu item MT29 displayed as "editing history".

Note that in the case that past virtual playlists PV (i.e. editing history) for the content (title T1) selected by the cursor CS1 have not been generated, the menu items MT28 and MT29 are not displayed and so are not available to be selected.

Upon the menu item MT28 of the menu list ML2 having been selected, the control unit 2 sees this as instructions having been given for restoring processing to return to the editing state of one prior. At this time the control unit 2 returns the virtual playlist PV that is correlated to the selected title T1 to the virtual playlist PV74 that is immediately prior from the newest virtual playlist PV75.

Figure 23:
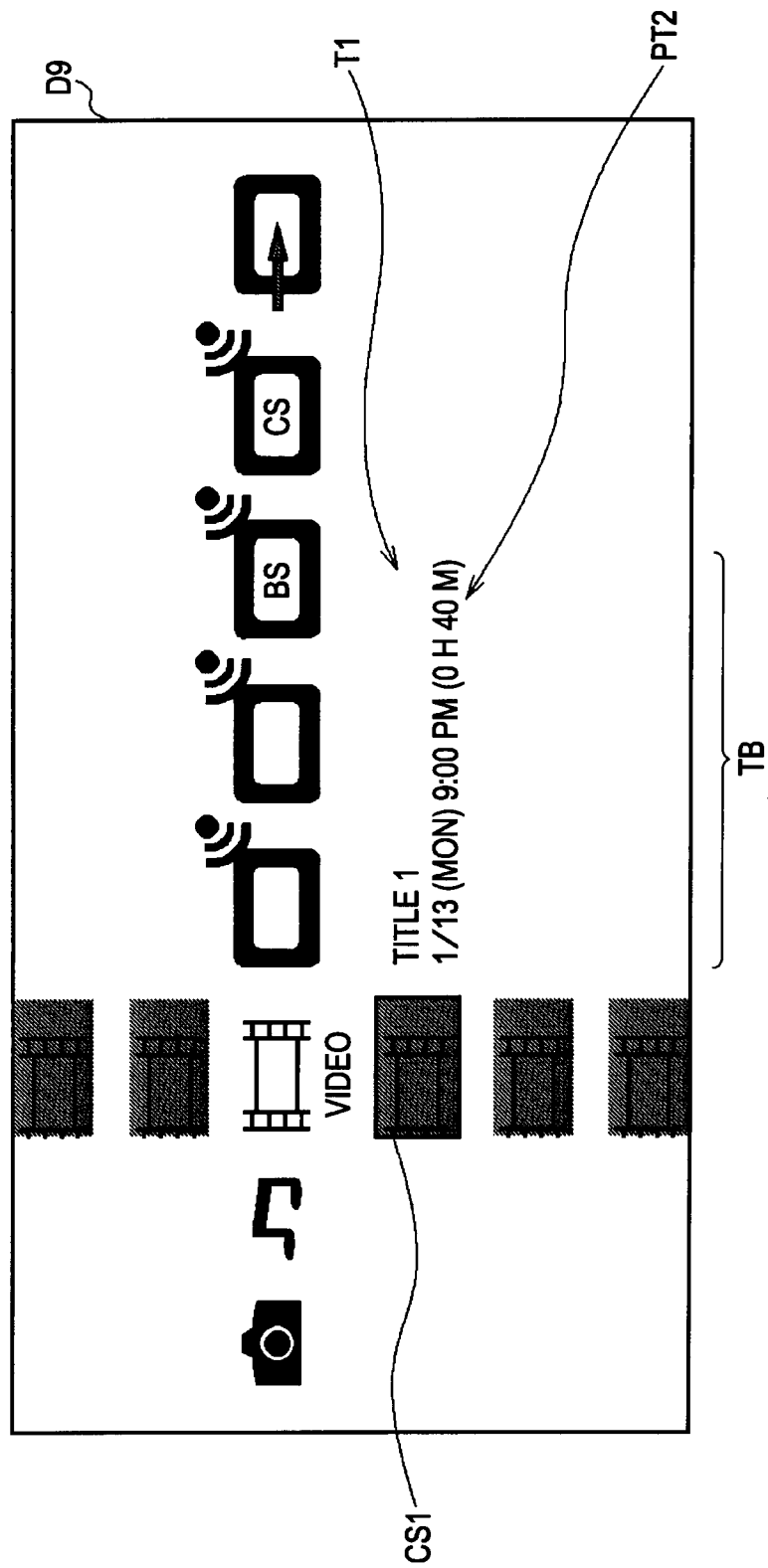
FIG. 23 is an outline diagram showing a title display screen after restoring processing.

Subsequently the control unit 2 displays the title T1 on the display screen D9 that presents the content title after completion of the restoring processing, as shown in FIG. 23 which corresponds to FIG. 21. Of the title labels TB correlated to the title T1 and displayed, the playing time PT2 is the 40 minutes before editing.

Now, the control unit 2 can perform restoring processing to restore the selected title T1 to the editing state immediately prior, according to menu operations of the user.

1-5-2. Immediately Previous Restoring Processing (2)

Now, color buttons (blue/red/green/yellow) for various types of operations with a digital method of television broadcasting are provided on the remote controller 4. The control unit 2 is configured so as to perform similar restoring processing in the case that the "blue" button is pressed on the remote controller 4 in the state of the title T1 having been selected by the cursor CS1 on the title display screen D7 (FIG. 21).

In this case the control unit 2 does not cause the user to perform operations to sequentially follow the menu hierarchy but only to press/operate the "blue" button, whereby restoring processing can be completed to return to the virtual playlist PV74 which shows the immediately prior editing state.

Figure 24:
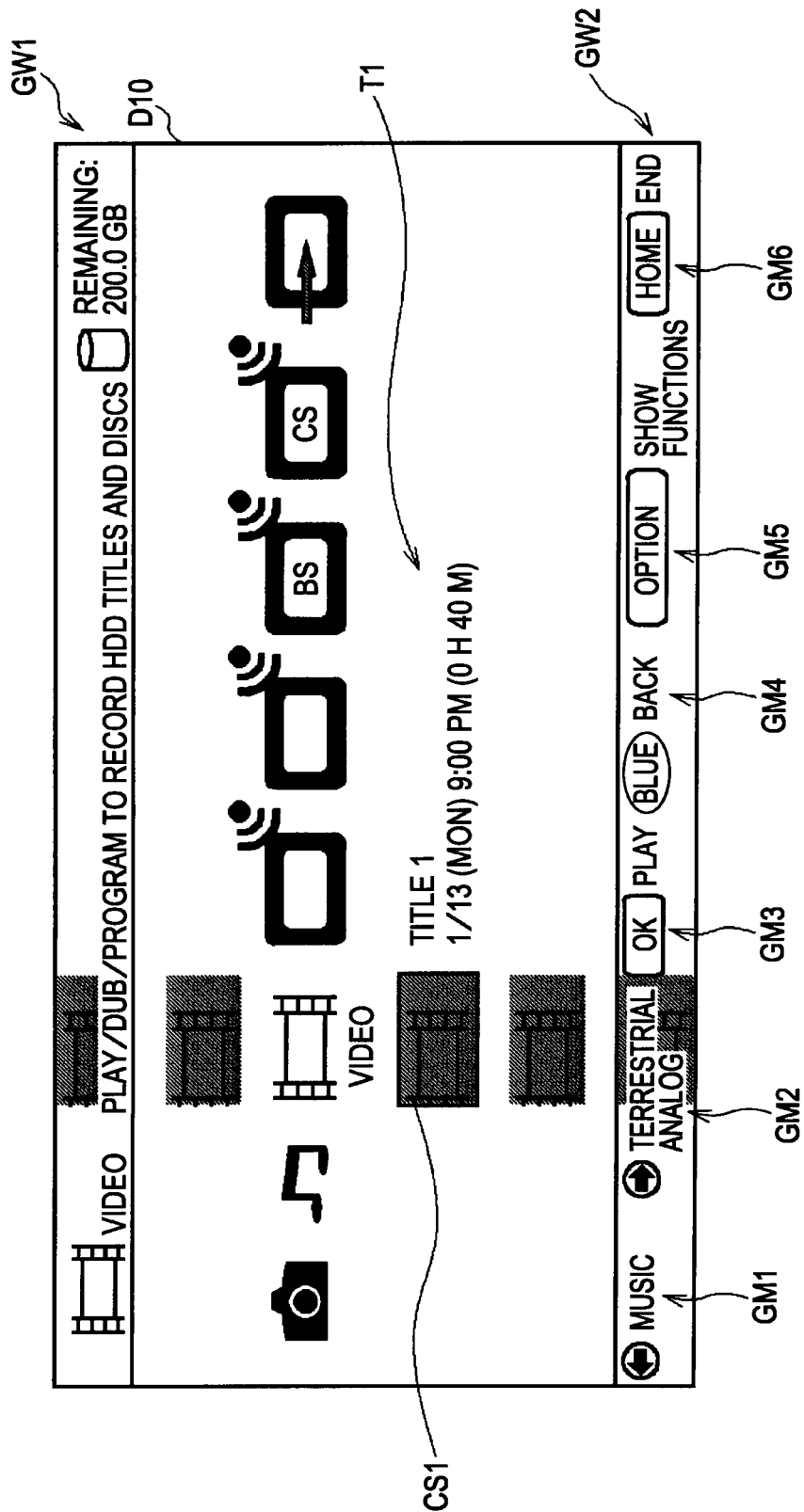
FIG. 24 is an outline diagram showing a guide display screen.

Also, the remote controller 4 has a "guide" button provided thereupon. Upon the "guide" button being pressed during display of the guide display screen D7 (FIG. 21) for example, the control unit 2 displays a guide display screen D10 wherein guide windows GW1 and GW2 are displayed in an overlapping manner in the vertical direction, as shown in FIG. 24.

Simple explanations of the state of the recording playing device 1 at this time and of the items selected are displayed in the guide window GW1. Also, primary buttons on the remote controller 4 and operation content by these buttons are correlated and displayed in the guide window GW2 as guide items GM1 through GM6.

In the case there is a past virtual playlist PV (i.e. editing history) for the title T1 selected by the cursor CS1, displays of the "blue" button and "return to one prior" are correlated and represented by the guide item GM4.

Upon the "blue" button having been pressed while in the state that the guide windows GW1 and GW2 are displayed, the control unit 2 executes restoring processing for the title T1 that is selected at this time.

Note that in the case that the "guide" button has been pressed, the control unit 2 guides the buttons for the user to operate with the guide window GW2, and upon the "blue" button of the remote controller 4 having been pressed, can immediately perform restoring processing of the selected title T.

1-5-3. Selection Restoring Processing

Also, the recording/playing device 1 selects a desired editing history from among multiple editing histories, based on user operations, and directly restores to the editing state of the selected editing history.

Figure 25:
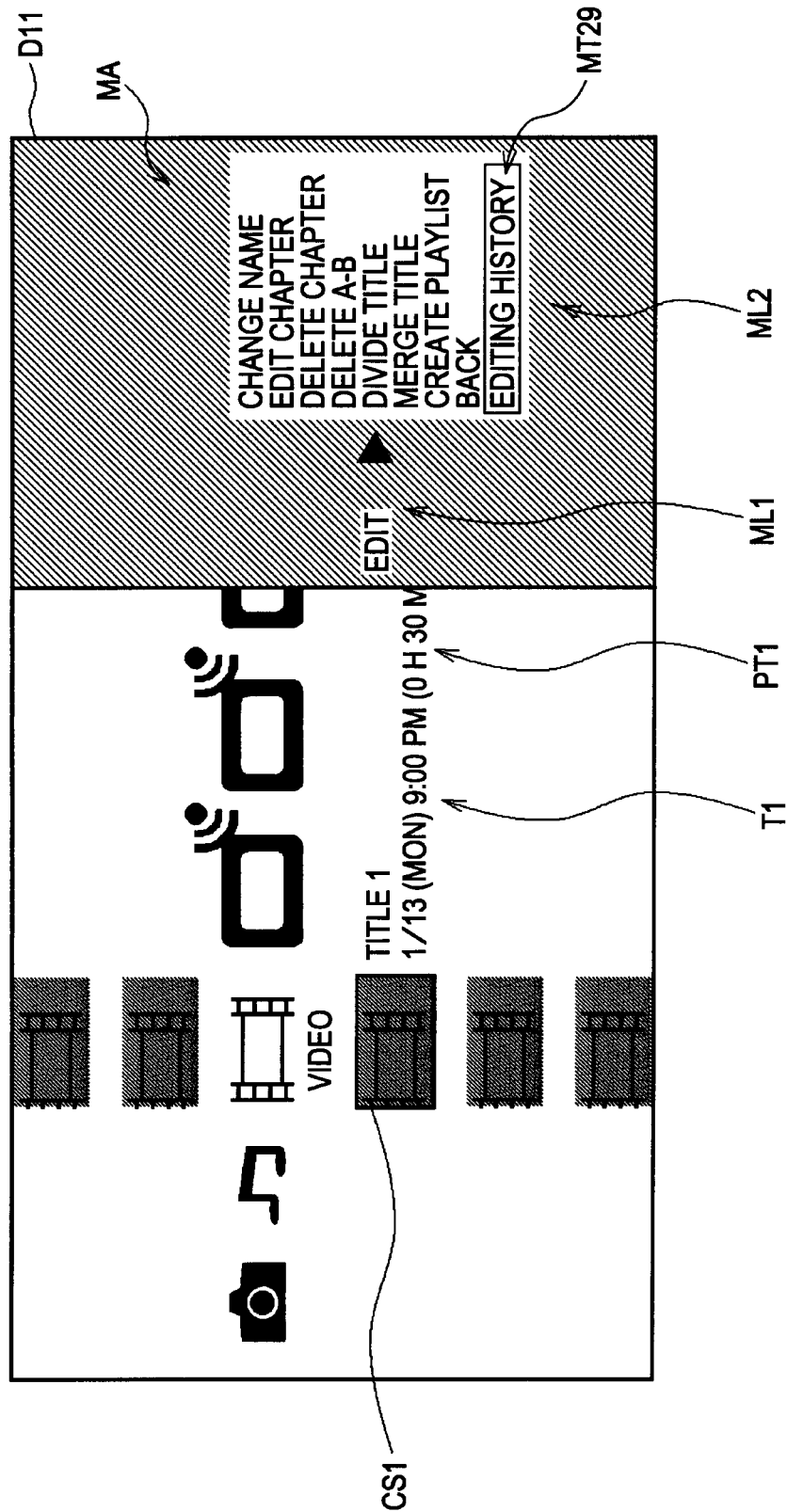
FIG. 25 is an outline diagram showing a display instruction screen of editing history.

Upon predetermined menu display operations having been performed by the user while the title T1 is selected by the cursor CS1 on the title display screen D7 (FIG. 21), the control unit 2 displays the menu region MA on the right side of the screen, as shown in FIG. 25. Also, upon operations having been performed by the user to follow a predetermined menu hierarchy, the control unit 2 sequentially loads and displays the menu lists ML1 and ML2 within the menu region MA.

Figure 26:
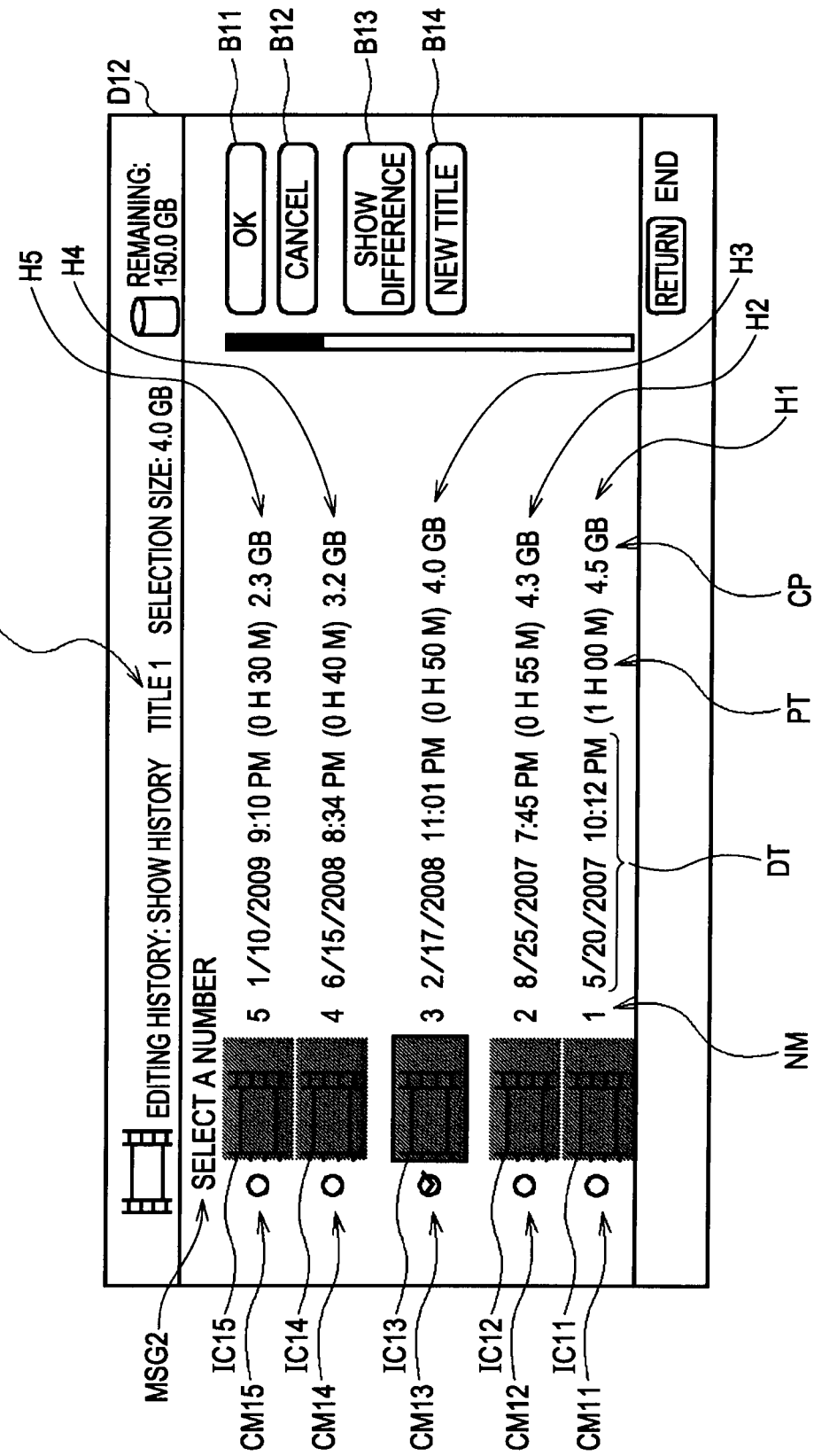
FIG. 26 is an outline diagram showing a first editing history selecting screen.

Upon the menu item MT29 (editing history) of the menu list ML2 having been selected, the control unit 2 sees this as display instructions having been given for the editing history, and displays this on the editing history selection screen D12 shown in FIG. 26.

The editing history selection screen D12 has a screen configuration similar to the title selection screen D4 (FIG. 12), and icons IC11 through IC15 and check boxes CM11 through CM15 are displayed. However, with the editing history selection screen D12, the editing histories H1 through H5 are displayed instead of the titles T11 through T15.

The editing histories H1 through H5 show past virtual playlists PV71 through PV75 (FIG. 20) corresponding to the titles T1 being selected, instead of respective independent titles T.

Note that on the editing history selection screen D12, a title name TNS of "Title 1" which is a title T being selected on the upper portion of the screen, and the title names for each of the editing histories H1 through H5 are not displayed. Also, in the case that there are six or more past virtual playlists PV for the title T being selected, a scrolling display is performed.

On the right side of the icons IC11 through IC15, a history number NM, date/time DT, playing time PT, and capacity CP are each displayed as information of the editing histories H1 through H5. Note that the history number NM starts with the first editing state as "1" and is sequentially added. Also, the date/time DT shows the date and time that the virtual playlist PV corresponding to each editing history H has been created, i.e. the editing date and time.

Thus, the editing history selection screen D12 is formed so that the past virtual playlist PV showing the editing history H can actually be recognized by the user with similar senses as with the independent title T. Similar to the case of the title selection screen D4 (FIG. 12), the control unit 2 selects or deselects the editing history H on the editing history selection screen D12.

Also, on the right portion of the editing history selection screen D12, in addition to a confirming button B1 and stopping button B2 similar to the title selection screen D4, a difference display button B13 and new title button B14 are arrayed in the vertical direction (details to be described later).

Upon the confirming button B1 having been pressed/operated in the state that one of the editing histories H is selected, the control unit 2 views this as instructions being given to directly return to the editing state of the selected editing history H. Now, let us say that the editing history H3 has been selected.

At this time the control unit 2 returns the virtual playlist PV correlated to the title T1 from the newest virtual playlist PV75 to the past virtual playlist PV73 which corresponds to the selected editing history H3.

Figure 20:
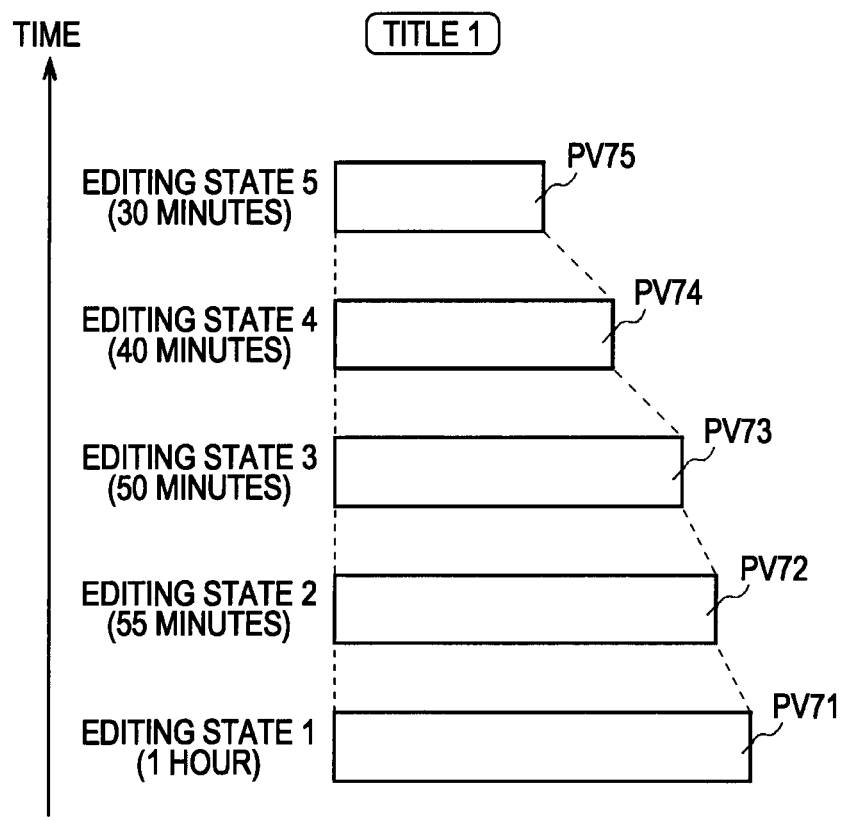
FIG. 20 is an outline diagram to accompany a description of change to a virtual playlist by title editing work.
Figure 27:
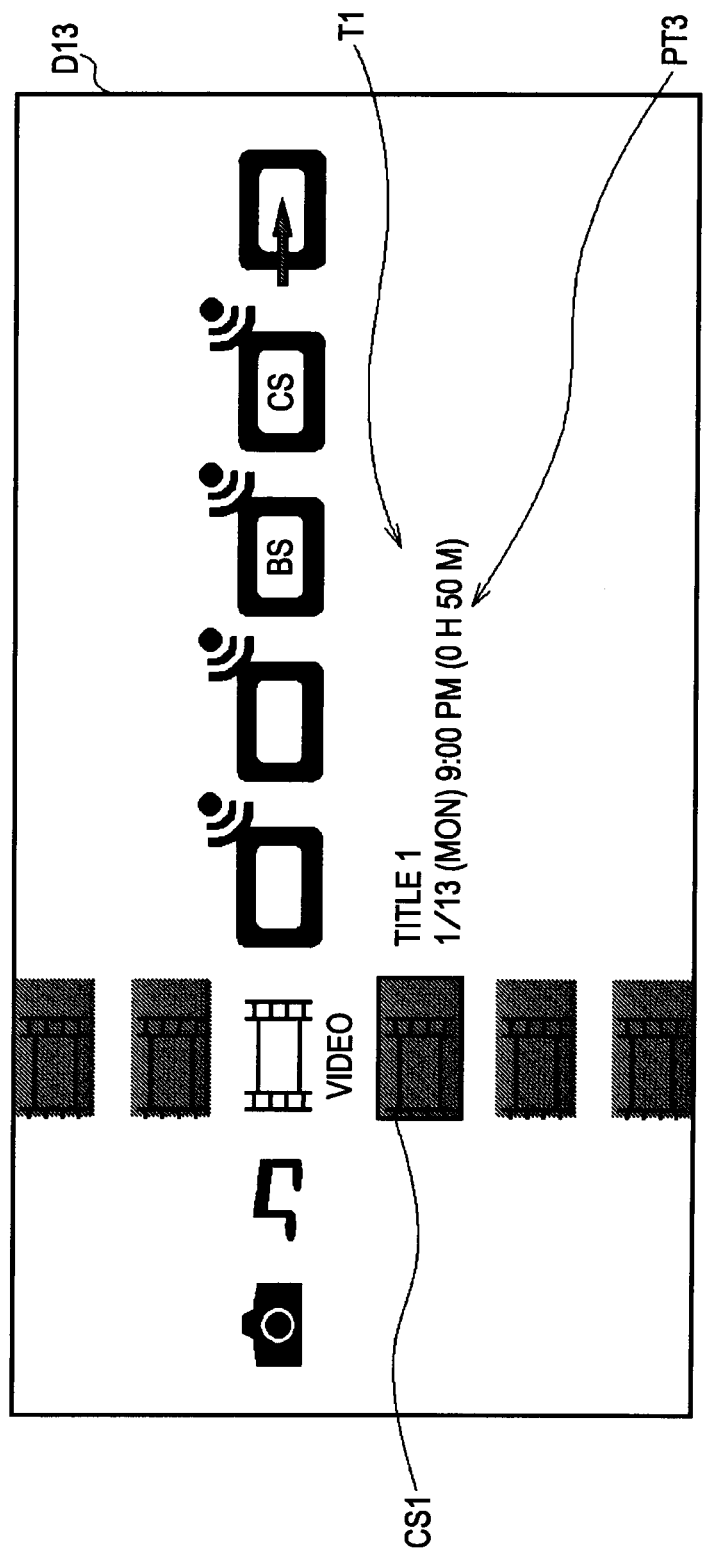
FIG. 27 is an outline diagram showing a title display screen after restoring processing.

Subsequently, as shown in FIG. 27 which corresponds to FIG. 25, the control unit 2 displays the title T1 on the title display screen D13 which presents the content title after completion of the restoring processing. At this time the playing time PT3 that is correlated to the title T1 and displayed is the 50 minutes of the editing state 3 (FIG. 20).

Note that the control unit 2 of the recording/playing device 1 can directly restore the selected title T1 to the past editing state according to the editing history selected by the user.

1-5-4. Difference Display

Also, the recording/playing device 1 is configured so as to perform difference display processing to display the difference of two selected editing histories on the screen, based on user operations.

Figure 28:
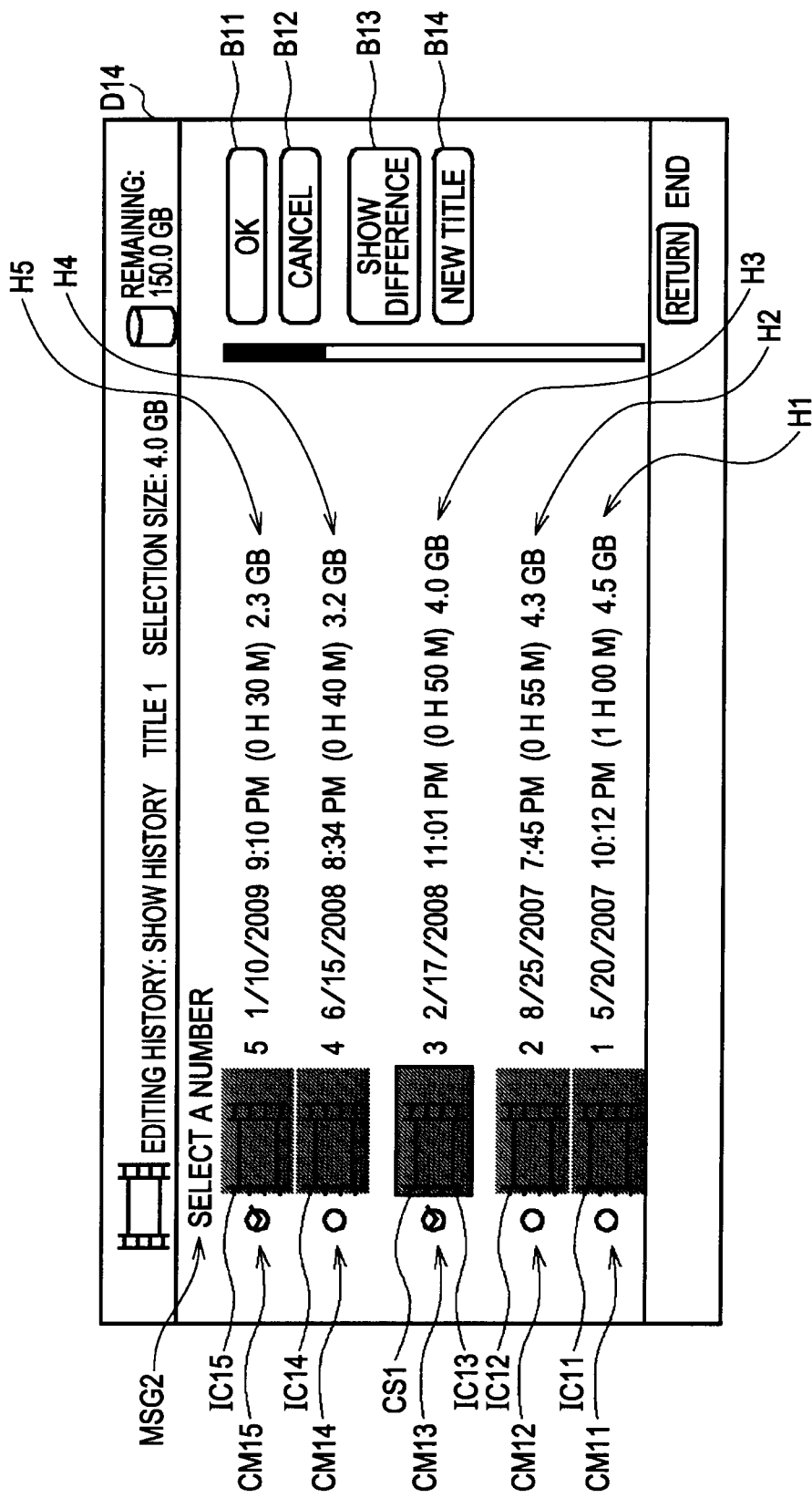
FIG. 28 is an outline diagram showing a second editing history selecting screen.

For example as shown in FIG. 28, a check mark is made on the check boxes CM13 and CM15 on the editing history selection screen D14 which corresponds to the editing history selection screen D12 (FIG. 26), whereby the titles T13 and T15 are selected.

Figure 29:
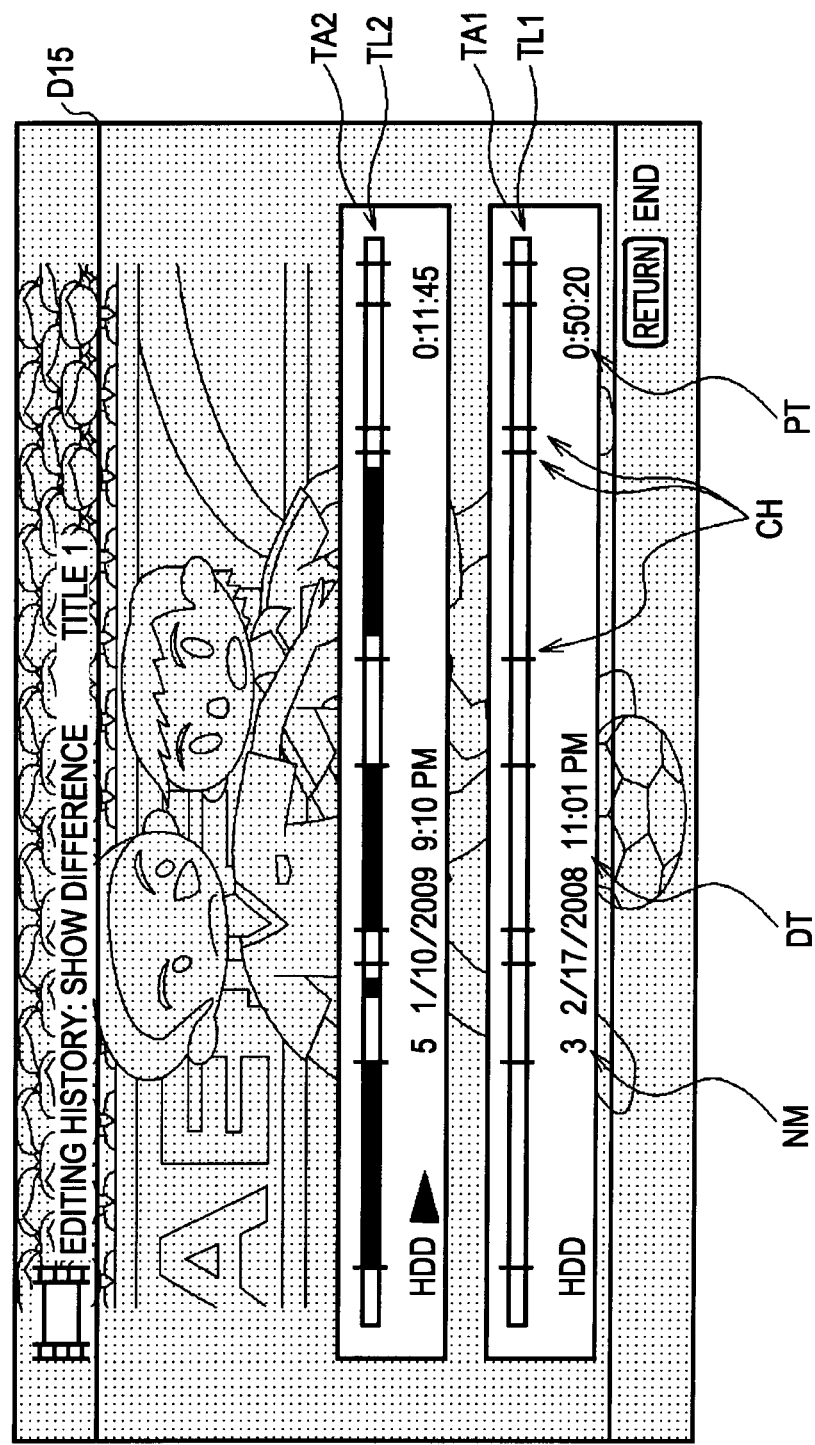
FIG. 29 is an outline diagram showing a difference display screen.

Upon pressing/operating the difference display button B13 in this state, the control unit 2 displays the difference display screen D15 shown in FIG. 29. On the difference display screen D15, long/thin time axis regions TA1 and TA2 are arrayed in the vertical direction in the left/right direction, on the side lower than the center of the screen. Also, the difference display screen D15 is formed so that a video of the content can be displayed on the background.

A timeline TL1 showing the passage of time in the left/ right direction is displayed in the time axis region TA1. The timeline TL1 corresponds to the editing history H3, and is configured so that the position and range can each be visibly confirmed on the time axis of the deleted portions (shown with diagonal lines) and the remaining portions, based on the virtual playlist PV73 (FIG. 20).

A timeline TL2 which corresponds to the timeline TL1 is displayed on the time axis region TA2. The timeline TL2 corresponds to the editing history H5, and is similarly configured to the timeline TL1, based on the virtual playlist PV75 (FIG. 20).

Also, on the lower side of the timelines TL1 and TL2, history numbers NM, date/time DT, and playing time PT displayed on the editing history selection screen D14 (FIG. 28) are each displayed on the time axis region TA1 and TA2.

Further, the control unit 2 is configured such that, upon predetermined playing instructions having been performed for the difference display screen D15, the content is played according to the virtual playlist PV73 and PV75, and the video thereof is displayed on the background of the difference display screen D15.

Note that the control unit 2 of the recording/playing device 1 can display the timelines TL1 and TL2 based on the two selected editing histories, according to the pressing operation of the difference display button B13.

1-5-5. Reuse of Editing History

Also, the recording/playing device 1 is configured so that reusing processing can be performed to register a past editing state showing an editing history H of an existing title T as the newest editing state of a separate, new title T, based on user operations.

For example, with the editing history selection screen D12 (FIG. 26), upon a new title button B14 having been pressed/ operated in the state that the editing history H3 for the existing title T1 is selected, the control unit 2 additionally registers the new title T31 in the title database DBT of the HDD 16.

Figure 30:
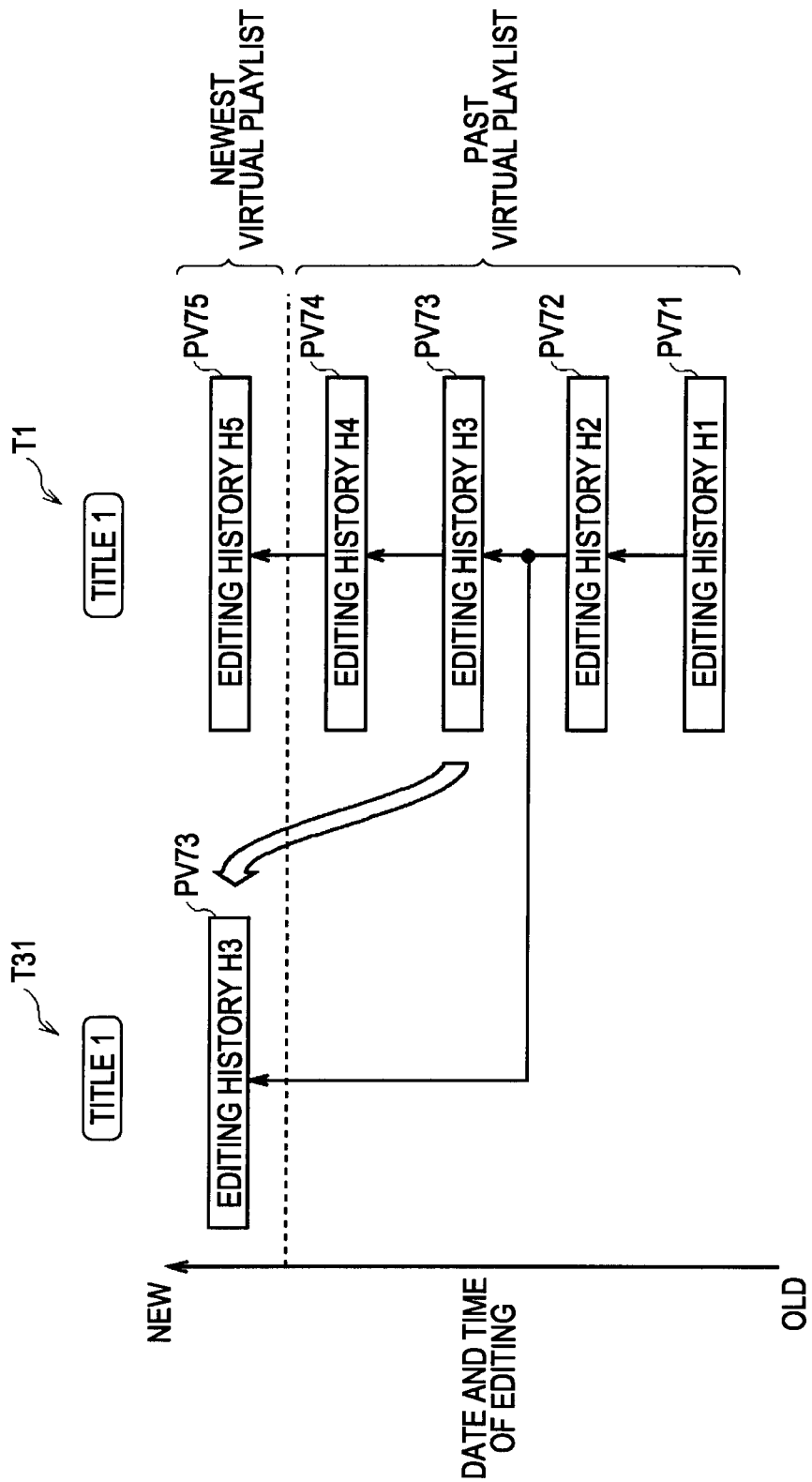
FIG. 30 is an outline diagram showing the correlation between the virtual playlist and reuse of the editing history.

At this time the control unit 2 correlates and registers the new title T31 and a past virtual playlist PV73 corresponding to the editing history H3, as shown in a schematic correlation diagram in FIG. 30.

Figure 31:
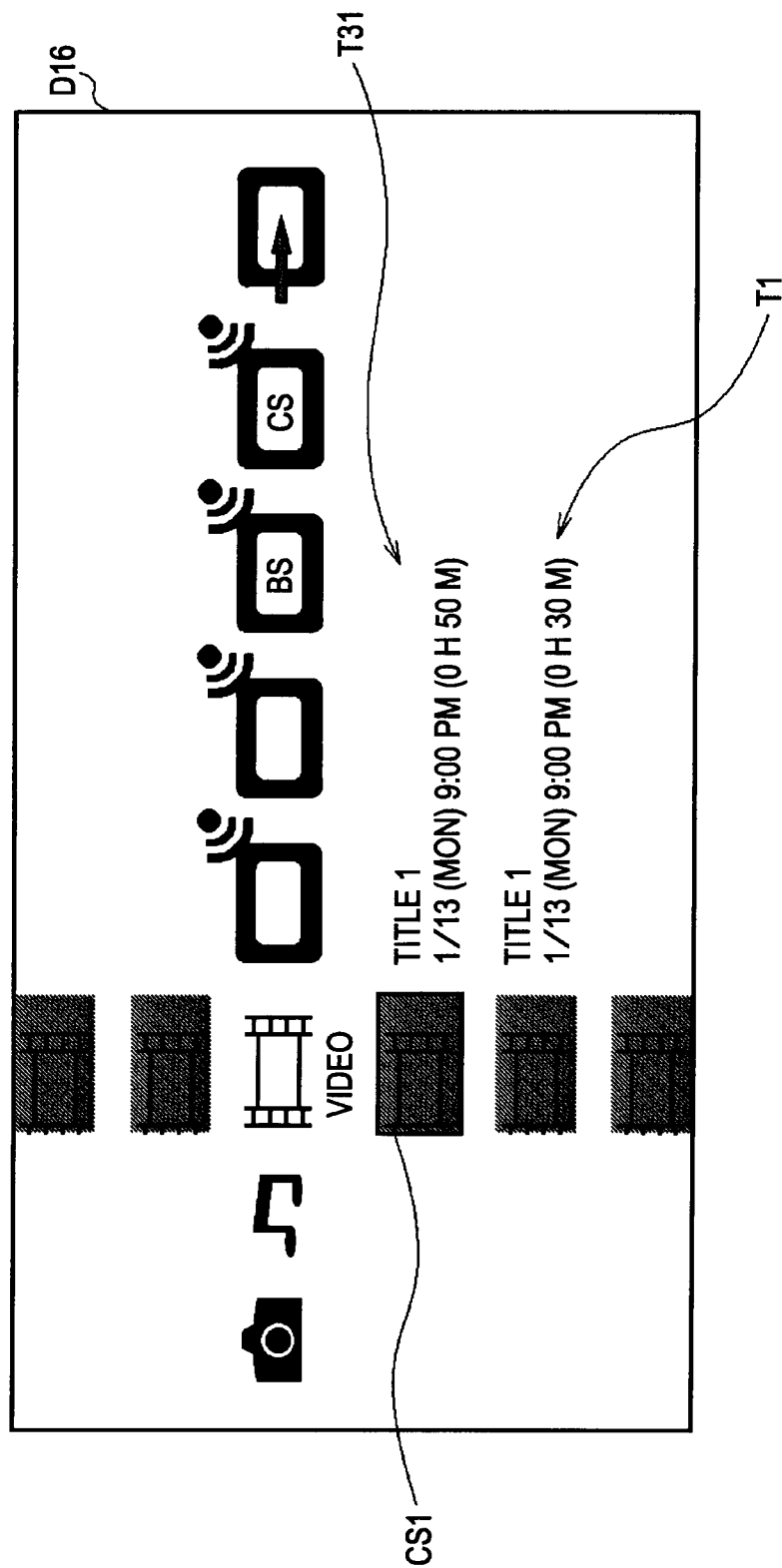
FIG. 31 is an outline diagram showing a title display screen after reuse processing.

Subsequently, as shown in FIG. 31 which corresponds to FIG. 21, the control unit 2 displays the newly created title T31 on the title display screen D16 that presents the content title after completion of the reusing processing, in addition to the existing title T1. The title T31 can perform playing processing and editing processing, similar to the existing title T1.

Note that the control unit 2 of the recording/playing device 1 can perform reusing processing wherein the virtual playlist PV, which is editing history H for an existing title T, is reused and becomes a new title T.

1-5-6. Recovery Processing

Also, the recording/playing device 1 is configured so that a title T that has been deleted once can be recovered again, based on user operations.

In an actual arrangement, in the case that deleting instructions are given by the user to delete the title T, the control unit 2 erases the title information TF of the instructed title T from the title database DBT, so that the title T is not displayed on the title display screen D4 (FIG. 12) and so forth.

At the same time, the control unit 2 stores the title information TF of the title T in a deleted title database DBTE within the HDD 16. Also, the control unit 2 keeps the virtual playlist PV correlated with the title T so as to be still correlated to the title T, while remaining stored in the playlist database DBP.

Figure 32:
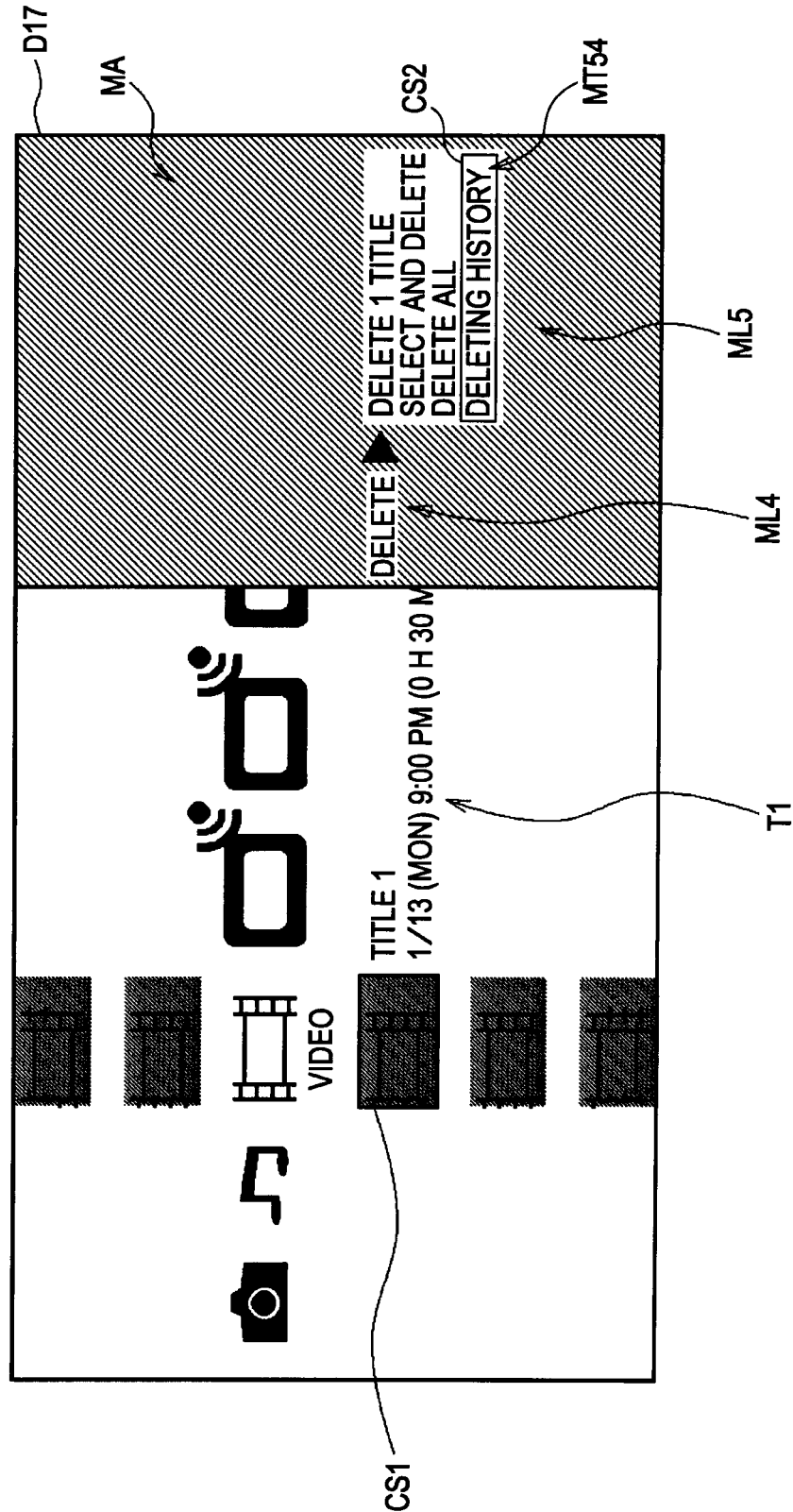
FIG. 32 is an outline diagram showing a display instruction screen of deleting history.

Upon predetermined menu display operations having been performed by the user on the title display screen D7 (FIG. 21), the control unit 2 displays a menu region MA on the right side of the screen as shown in FIG. 32. Also, upon predetermined operations having been performed by the user to follow the menu hierarchy, the control unit 2 sequentially expands the menu list ML4 and ML5 and displays this in the menu region MA.

Multiple menu items MT including the menu item MT54 displayed as "history of deletions" are displayed in the menu list ML5. Note that in the case that an already-deleted title T does not exist, the menu item MT54 is not displayed and so is not available to be selected.

Figure 33:
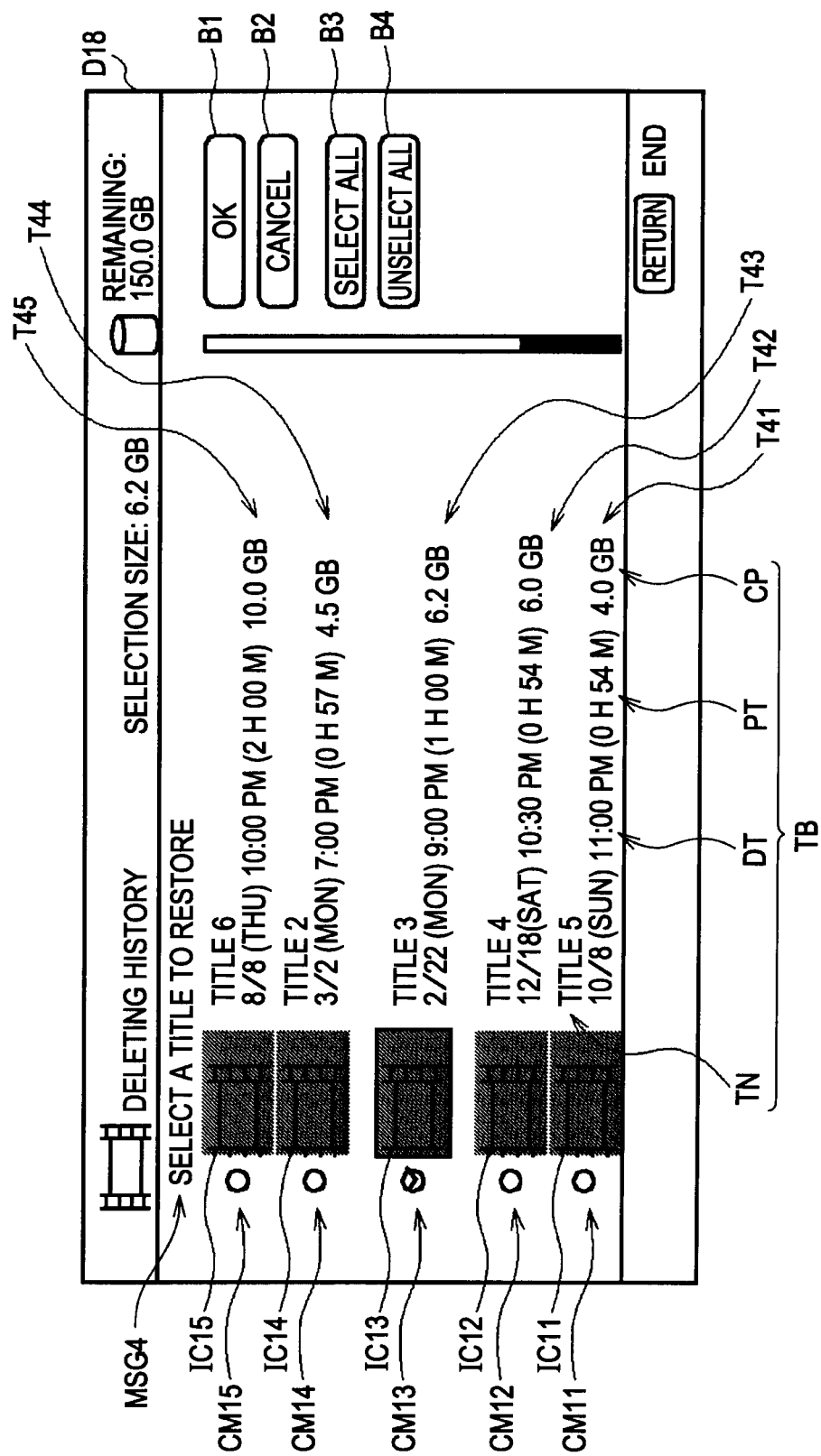
FIG. 33 is an outline diagram showing a deleting history screen.

Upon the menu item MT54 of the menu list ML5 having been selected, the control unit 2 views this as instruction being given for recovery processing to recover an already-deleted title T, and displays the deleting history display screen D18 shown in FIG. 33.

The deleting history display screen D18 has a screen configuration similar to the title display screen D4 (FIG. 12), and the icons IC11 through IC15 and check boxes CM11 through 15 are displayed. Also, with the deleting history display screen D18, instead of titles T11 through T15 showing existing titles, titles T41 through T45 of which the title information TF are stored in the deleted title database DBTE are displayed.

As title labels TB of the various titles T, the title name TN, date/time DT, playing time PT, and capacity CP are displayed. Of these, the date/time DT shows the date/time of the deleting.

With the deleting history display screen D18, a message MSG4 such as "please select the title to restore" is displayed on the upper portion of the screen, and the user is prompted to select the title T.

Upon a pressing operation of the confirming button B1 having been performed in the state that one of the titles T is selected, the control unit 2 erases the title information TF of the selected title T from the deleted title database DBTE re-registers in the title database DBT. The virtual playlist PV that has been correlated with the title T at this time maintains the state of continuously being correlated to the title T.

Figure 34:
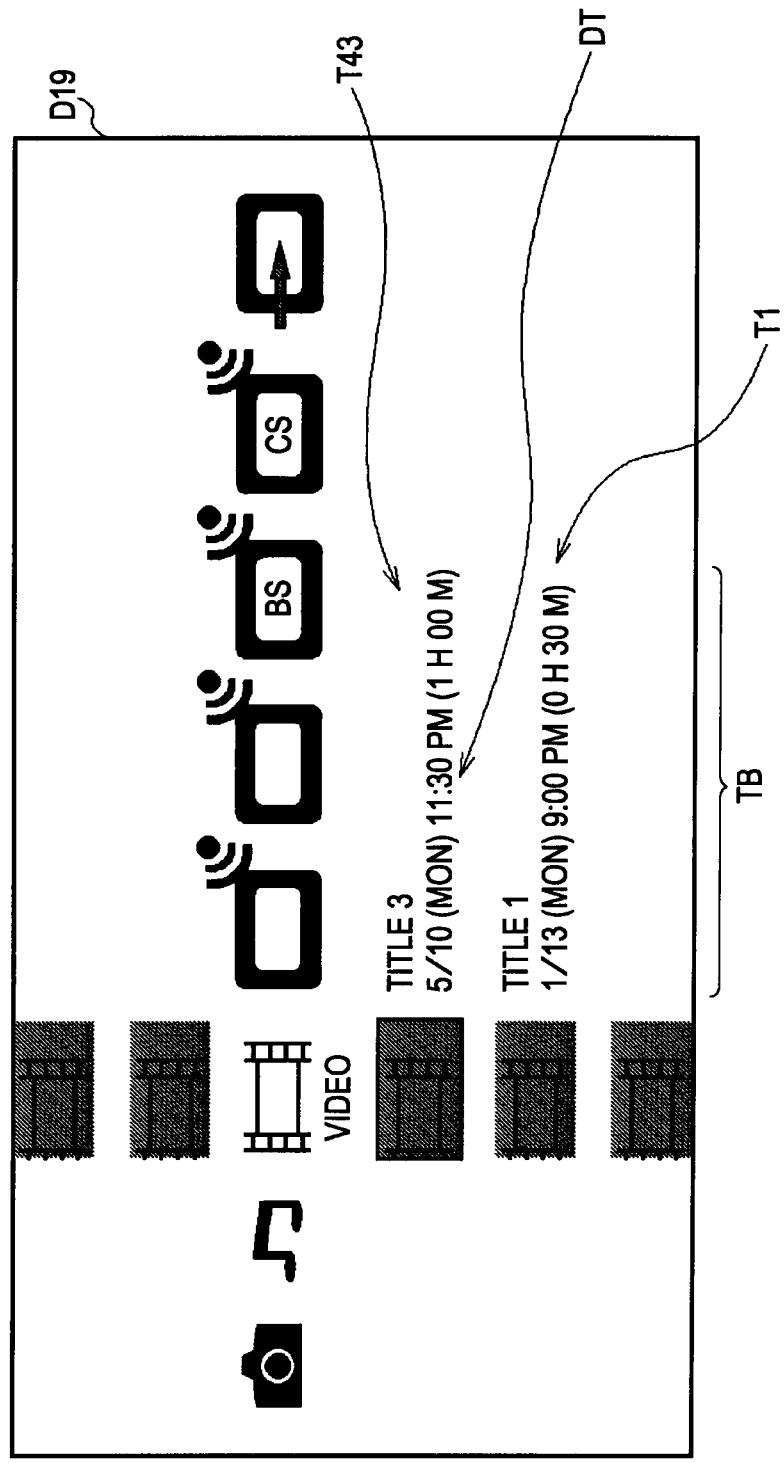
FIG. 34 is outline diagram showing a title display screen after resurrection processing.

As a result, as shown in FIG. 34 which corresponds to FIG. 21, in addition to the originally existing title T1, a title T43 that has been re-registered by the recovery processing is displayed on the title display screen D19 that presents the content title after completing the recovery processing. Note that the date/time DT of the title label TB of the title T43 shows the date and time that the virtual playlist PV which is correlated with the title T43 has created, similar to the case of another title T. Also, similar to the existing title T1, the recovered title T43 can perform playing processing and editing processing.

Note that the control unit 2 of the recording/playing device 1 is configured so that, of the titles T subjected to deleting processing once and managed in the deleted title database DBTE, the title T selected by the user is registered in the title database DBT again and recovered.

1-6. Operations and Advantages

With the above configuration, the control unit 2 of the recording playing device 1 correlates the AV stream ST with the recording time of the television program, generates a real playlist PR and virtual playlist PV, and stores these in the HDD 16.

Also, the control unit 2 stores the title information TF that is correlated with the virtual playlist PV in the title database DBT of the HDD 16, as content title T.

On the title display screen D1 (FIG. 4) and the like, the control unit 2 displays only the title T of which the title information TF is registered in the title database DBT and causes the user to visibly recognize, while receiving instructions for playing, editing, and so forth.

Subsequently, upon receiving editing instructions as to the title T, the control unit 2 holds the existing virtual playlist PV without modification, and generates a new virtual playlist that reflects the editing instructions and correlates this to the title T. Also at this time the control unit 2 holds the real playlist PR and AV stream ST without modification.

In other words, we can say that the control unit 2 virtualizes the content and handles this with the virtual playlist PV, and the actual real playlist PR and AV stream ST are saved without modification.

Accordingly, since the unmodified AV stream ST is saved, the control unit 2 can readily realize processing to restore at least the portions (scenes SC) that have already been deleted after editing operations. Also, since the virtual playlist PV showing the previous editing state is saved, the control unit 2 can also readily realize processing to return to the previous editing state.

At this time, since only the newest virtual playlist PV is correlated as to the title T, the control unit 2 can cause the user to recognize that the newest editing state of each title T is reflected, via the title display screen D1 (FIG. 4) and so forth.

Also, the control unit 2 automatically correlates the newest virtual playlist PV as to the title T, and automatically releases the correlation with the past virtual playlist PV.

Accordingly, the control unit 2 can cause the user to recognize that the title T expresses the content itself, as has been the case before, without causing the user to notice the existence of the past virtual playlist PV, real playlist PR, and AV stream ST, and various types of operations can be performed.

At this time, the control unit 2 does not have to cause the user to perform complicated managing work or the like such as creating, updating, and modifying correlations to the virtual playlist PV.

Also, the actual capacity of each playlist (e.g. around several kB to several tens of kB) can be an extremely small number as compared to the actual capacity of the AV stream ST (e.g. around several hundred MB to several GB). Therefore, the ratio that each playlist takes up as to the storage capacity of the HDD 16 can also be suppressed to be extremely small.

Further, in the case of the user desiring, the control unit 2 presents the virtual playlist PV which is a past editing history and the title T that has been deleted once, and can perform restoring processing or recovery processing, and further, reusing processing.

At this time, either in the case that a predetermined menu operation is performed (FIG. 22), or in the case that direct operations are performed with a "blue" button or the like on the remote controller (FIG. 24), the control unit 2 can perform restoring processing. Further, the control unit 2 can display a menu of multiple editing histories (FIG. 26) and directly restore to the editing history (editing state) selected by the user, whereby operability/workability that meets the preferences of the user can be realized.

Further, with the reusing processing to create a new title T based on the editing history for an existing title T, the control unit 2 not only simply restores to the past editing state, but can also improve work efficiency in the case of the user creating a new title T.

Here, we assume a case wherein a virtual playlist PV is not created at the time of recording the television program (i.e. at the time of creating content), the real playlist PR is correlated to the title T, and editing processing is performed directly as to the real playlist PR.

Figure 35A:
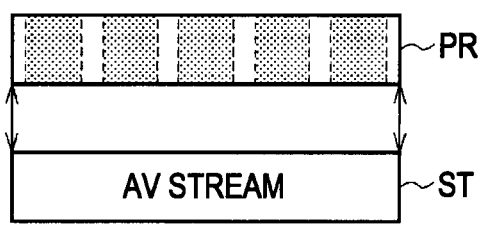
FIGS. 35A and 35B are outline diagrams showing a playlist configuration according to the related art.

Specifically, as shown in FIG. 35A which corresponds to FIG. 3, let us assume that an extracted portion (shown with diagonal lines) which is a portion of the real playlist PR, and editing instructions are given to delete the deletion portions other than these (the white portions).

Figure 35B:
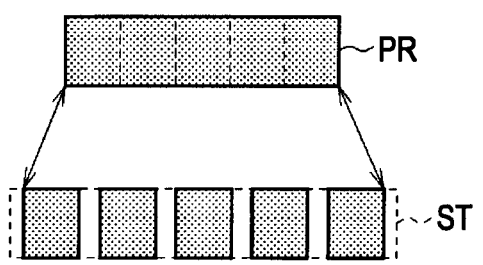

The real playlist PR is correlated 1-to-1 with the AV stream ST, as described above. Therefore, upon the deletion portion of the real playlist PR having been deleted, the portions applicable to the deletion portions of the AV stream ST are also deleted, as shown in FIG. 35B.

In this case, for the portions of the AV stream ST that have been deleted once, the data has already been lost, so neither restoring processing to return to the original, nor reusing the data, can be performed.

Conversely, while the editing operations are performed as to the virtual playlist PV as described above, the control unit 2 of the recording/playing device 1 does not modify the real playlist PR and AV stream ST, and further stores the past virtual playlist PV in the HDD 16.

Therefore the control unit 2 can realize the above-described restoring processing, recovery processing, and reusing processing and so forth, and at this time does not force the user to perform complicated operations.

Further, as to the format and so forth of the virtual playlist PV, the control unit 2 basically adheres to the playlist used with BD media and so forth. Therefore, in the case of moving or copying the title T to BD media for example, with the control unit 2, the virtual playlist PV is set as the real playlist PR of the title T, and only the portions of the AV stream ST that correspond to the virtual playlist PV should be extracted. At this time the control unit 2 does not have to perform complicated conversion processing or the like, and can stored the title T to meet the standards of BD media.

Also, along with generating feature quantity DS, the control unit 2 follows the user instructions and settings and so forth, divides the real playlist PR into multiple scenes SC based on the feature quantity DS, and generates an extracted playlist PVS where only scenes SC meeting the predetermined conditions are extracted.

Therefore, the control unit 2 does not cause the user to perform editing work, and can automatically generate an extracted playlist PVS of which only the portions out of the entire content having a high probability that the user will want to view/listen are extracted.

At this time the control unit 2 does not modify the existing AV stream ST or real playlist PR, and generates the extracted playlist PVS while the full-range playlist PVA remains. Therefore the control unit 2 can cause the user to view/listen only to scenes SC extracted by the extracted playlist PVS, or to view/listen to the full-range of contents by the full-range playlist PVA, according to the desire of the user.

Further, with the control unit 2, the extracting patterns can differ by television program genre, whereby appropriate scenes can be extracted according to genre, such as extracting highlight scenes having a probability of being viewed/listened to with priority if this is a sports program, for example.

According to the above configuration, the recording/playing device 1 correlates the AV stream ST at the time of recording the television program and generates the real playlist PR and virtual playlist PV, and correlates the content title T and virtual playlist PV. Also, the recording/playing device 1 displays the title T as content, and executes the playing processing using the virtual playlist PV according to instructions such as playing as to the title T. Further, upon the recording/playing device 1 receiving editing instructions as to the title T, a new virtual playlist PV is generated which reflects the editing instructions and is correlated to the title T, without modifying the existing virtual playlist PV. Thus the recording/playing device 1 can readily realize processing to restore the title T to the state before the editing processing and processing to recover the title T that has already been deleted.

2. Second Embodiment

2-1. Configuration of Information Processing Device

According to a second embodiment, recording and playing of content is performed by an information processing device 70 instead of the recording/playing device 1, wherein editing operations of the content can also be performed.

As shown in FIG. 36, the information processing device 70 does not have circuits for receiving television broadcasts, i.e., the tuner unit 11 and so forth, as compared with the recording/playing device 1, and is arranged to externally acquire contents of predetermined formats.

Also, the information processing device 70 is configured in the same way as with a so-called personal computer or the like, with a control unit 71 centrally controlling the whole.

The control unit 71 is configured in the same way as with the control unit 2 of the recording/playing device 1 (FIG. 1), with a CPU 71A, ROM 71B, and RAM 71C, corresponding to the CPU 2A, ROM 2B, and RAM 2C, respectively mutually connected via a bus 72. Also, the control unit 71 is arranged to realize functions the same as those of the encoder/decoder 13 and encryption processing circuit 21 in the recording/playing device 1, by executing a predetermined program.

The bus 72 is connected to an input/output interface 73 for managing input/output of data. That is to say, the control unit 71 is connected with an input unit 75, storage unit 76, drive 77, output unit 78, and communication unit 79, via the bus 72 and input/output interface 73.

The input unit 75 is configured of a keyboard, mouse, or the like, and is arranged to accept operation instructions from the user. The input unit 75 corresponds to the remote controller 4 and operating unit 5 of the recording/playing device 1.

The storage unit 76 is configured of an HDD for example, and is configured to store, as contents, the AV stream ST, content database DBC, title database DBT, feature quantity database DBS, playlist database DBP, and so forth. The storage unit 76 corresponds to the HDD 16 and non-volatile memory 17 of the recording/playing device 1.

The drive 77 is configured of a BD drive for example, and is configured so as to be capable of writing various types of data to removable media 105 made up of a BD disc or the like for example, and also read out various types of data from the removable media 105. The drive 77 corresponds to the optical disc drive 18 or memory card interface 19 of the recording/playing device 1.

The output unit 78 is configured to convert video data and audio data supplied via the input/output interface 73 into video signals and audio signals respectively, so as to be supplied to an external monitor device (not shown) and speakers (not shown), respectively. This output unit 78 corresponds to the video processing unit 14 and audio processing unit 15 of the recording/playing device 1.

The communication unit 79 is connected to an external video device (unshown), or is connected with an external server or the like (unshown) via a predetermined network, so as to exchange data such as contents and the like. Specifically, this is configured of a cable/wireless LAN (Local Area Network) interface, USB (Universal Serial Bus) interface, IEEE 1394 (Institute of Electrical and Electronics Engineers) interface, or the like. The communication unit 79 corresponds to the network interface 20 of the recording/playing device 1.

Thus, the information processing device 70 is capable of realize the functions corresponding to each part of the recording/playing device 1 when compared therewith, except for the tuner unit 11.

2-2. Playlist Generating and Editing Processing

The control unit 71 of the information processing device 70 receives supply of AV streams ST serving as content, from external video devices and servers and the like via the communication unit 79, and stores these in the content database DBC of the storage unit 76.

It should be noted that upon receiving supply of a content having a data format differing from that of the AV stream ST, the control unit 71 performs predetermined encoding processing and the like, thereby converting into a data format the same as that of the AV stream ST.

At this time, the control unit 71 generates a real playlist PR, virtual playlist PV, and title information TF, for the content, in the same way as the case of the control unit 2 of the recording/playing device 1 performing recording processing of a television program, which are each stored in the storage unit 76.

Subsequently, the control unit 71 displays a title display screen D1 (FIG. 4) or the like on an external monitor device of the like, in response to user operation instructions or the like.

Also, the control unit 71 generates a new virtual playlist PV and correlates this to the title T, or performs restoring processing, recovery processing, reusing processing, and so forth, in accordance with editing instruction as to the content (i.e., the title T).

Further, the control unit 71 generates a feature quantity DS of the content and stores this in the storage unit 76, or generates an extracted playlist PVS using the feature quantity DS, in accordance with user operation instructions and the like.

Note that with the control unit 71, multiple extracting patterns are created beforehand, and extracted playlists PVS are generated following extracting patterns specified by the user.

2-3. Operations and Advantages

With the above configuration, the control unit 71 of the information processing device 70 generates a real playlist PR and virtual playlist PV correlated to the AV stream ST at the time of obtaining contents externally, and stores these in the storage unit 76.

Also, the control unit 71 stores, in the title database DBT of the storage unit 76, title information TF correlated with the virtual playlist PV, as the title T of the content.

The control unit 71 displays only titles T regarding which title information TF has been registered in the title database DBT on the title display screen D1 (FIG. 4) or the like, for visual recognition by the user, and also accepts instructions such as playing, editing, and so forth.

Subsequently, upon accepting editing instructions as to the title T, the control unit 71 holds the already-existing virtual playlist PV without change, and generates a new virtual playlist PV in which the editing instructions have been reflected and correlates this with the title T. Also, at this time, the control unit 71 does not change the real playlist PR or AV stream ST, and holds these without change.

Accordingly, the control unit 71 saves the unchanged AV stream ST, and thus can easily realize processing for restoring portions which have been already deleted after editing operations (scene SC) at least. Also, the control unit 71 saves a virtual playlist PV showing the previous editing state, and accordingly can easily realize processing for returning to the previous editing state.

Otherwise, the control unit 71 can exhibit the same operations and advantages as with the first embodiment, except for the point of using an extracting pattern corresponding to genres of television programs.

According to the above configuration, the information processing device 70 generates a real playlist PR and virtual playlist PV correlated with an AV stream ST at the time of acquiring contents, and correlates the title T of the content with the virtual playlist PV. Also, the information processing device 70 displays the title T as the content, and executes playing processing and so forth using the virtual playlist PV in accordance with instructions to the title T such as playing and so forth. Further, upon accepting an editing instruction as to the title T, the information processing device 70 generates a new virtual playlist PV reflecting the editing instructions without changing the already-existing virtual playlist PV, and correlates with the title T. Accordingly, the information processing device 70 can easily perform processing for restoring the title T to the state before the editing operation, and processing for recovering a deleted title T.

3. Other Embodiments

Note that with the above-described embodiments, description has been made regarding a case of saving and not changing past virtual playlists PV at the time of performing editing processing. The present invention is not restricted to this, and an arrangement may be made wherein, in a case where past editing history is not to be used for example, past virtual playlists PV are deleted at the time of generating the newest virtual playlist PV by editing processing. In this case, the real playlist PR and AV stream ST are saved, and accordingly returning to at least the first editing state can be performed.

Also, with regard to past virtual playlists PV, not all have to be saved, and a part may be deleted at an arbitrary timing. In this case, selection of virtual playlists PV to be stored can be made based on various standards, such as for example, having a predetermined number to begin with, or at predetermined intervals, or that immediately before predetermined editing operations are performed, or determined based on the relation as to the available capacity of the HDD 16, and so on.

Further, with the first embodiment, description has been made regarding a case wherein titles of user contents are presented by way of the title display screens D1 (FIG. 4), D3 (FIG. 11) and D9 (FIG. 23) and so on, title selection screen D4 (FIG. 12), editing history selection screens D12 (FIG. 26) and D14 (FIG. 28), and deleting history display screen D18 (FIG. 33).

The present invention is not restricted to this, and an arrangement may be made wherein, in various cases of causing the user to recognize the title T, the title T of the content can be presented to the user by various other title display screens and the like. In this case, what is important is that the user is made to recognize the virtual playlist PV, which is stored within the recording/playing device 1 and is correlated with the title T, as being the tile T itself. This holds true for the second embodiment as well.

Further, with the second embodiment described above, a case has been described wherein a virtual playlist PV is generated when the information processing device 70 acquires contents externally. The present invention is not restricted to this, and a virtual playlist PV may be generated in the same way with the first embodiment as well, when the recording/playing device 1 acquires contents from an optical disc 100, memory card 101, or unshown external device.

Also, with the above-described embodiments, description has been made regarding a case wherein restoration is made to an immediately-preceding editing state or an arbitrary editing state instructed by the user, as restoring processing. The present invention is not restricted to this, and an arrangement may be made wherein restoration is directly made to another editing state. For example, a menu item MT such as "return to beginning" may be added to the menu list ML2 of the instruction screen D8 (FIG. 22) for restoration processing, so as to return to the first editing state upon this menu item being selected.

Further as selection techniques for the editing state to return to, description has been made with the above-described embodiments regarding cases of selecting a menu item MT28 (FIG. 22) such as "return to one prior" or displaying an editing history selection screen D12 (FIG. 26) with the editing history H being selected. The present invention is not restricted to this, and selection of the editing state to be restored may be made with various techniques, such as for example, the user specifying a predetermined capacity CP and searching with the specified capacity CP as a search condition, and so forth.

Further, an arrangement may be made wherein the user inputs an arbitrary comment or the like to an editing history H (i.e., past virtual playlist PV), with the comment being display on the editing history selection screen D12 (FIG. 26), or a keyword search being made for a word in the comment.

Further, with the above-described embodiments, a case has been described wherein, in difference display processing, two editing histories H are selected on the editing history selection screen D14 (FIG. 28), and the difference thereof is represented by timelines TL1 and TL2 (FIG. 29). The present invention is not restricted to this, and may represent the difference between, for example, the newest editing state, and one editing history H selected by the user, or three or more editing histories H may be selected and the differences represented by time lines TL of a number corresponding to the editing histories H.

Further, with the above-described first embodiment, a case has been described wherein, at the time of completion of recording processing of a television program, a feature quantity DS is generated, and an extracted playlist PVS is generated based on the feature quantity DS. The present invention is not restricted to this, and arrangements may be made wherein the feature quantity DS is generated or the extracted playlist PVS is generated at various timings, such as when specified by the user after completion of recording for example, or when the processing load of the control unit 2 is light, and so forth. With the second embodiment as well, arrangements may be made wherein the feature quantity DS is generated or the extracted playlist PVS is generated not just at when obtaining contents externally but at an arbitrary timing. Further, an arrangement may be made wherein the feature quantity DS and the extracted playlist PVS is generated only regarding television programs of genres specified beforehand, for example.

Further, with the above-described first embodiment, a case has been described wherein the extracted playlist PVS is generated using an extracting pattern corresponding to the genres of television programs. The present invention is not restricted to this, and an arrangement may be made wherein the extracted playlist PVS is made using extracting patterns corresponding to the broadcast channel of the television program or the broadcasting time thereof, or extracting patterns specialized for particular television programs, for example.

Further, with the above-described embodiments, a case has been described wherein only one extracted playlist PVS is generated for one extracted playlist generating processing. The present invention is not restricted to this, and an arrangement may be made wherein two or more extracted playlists PVS are generated for one extracted playlist generating processing.

Figure 37:
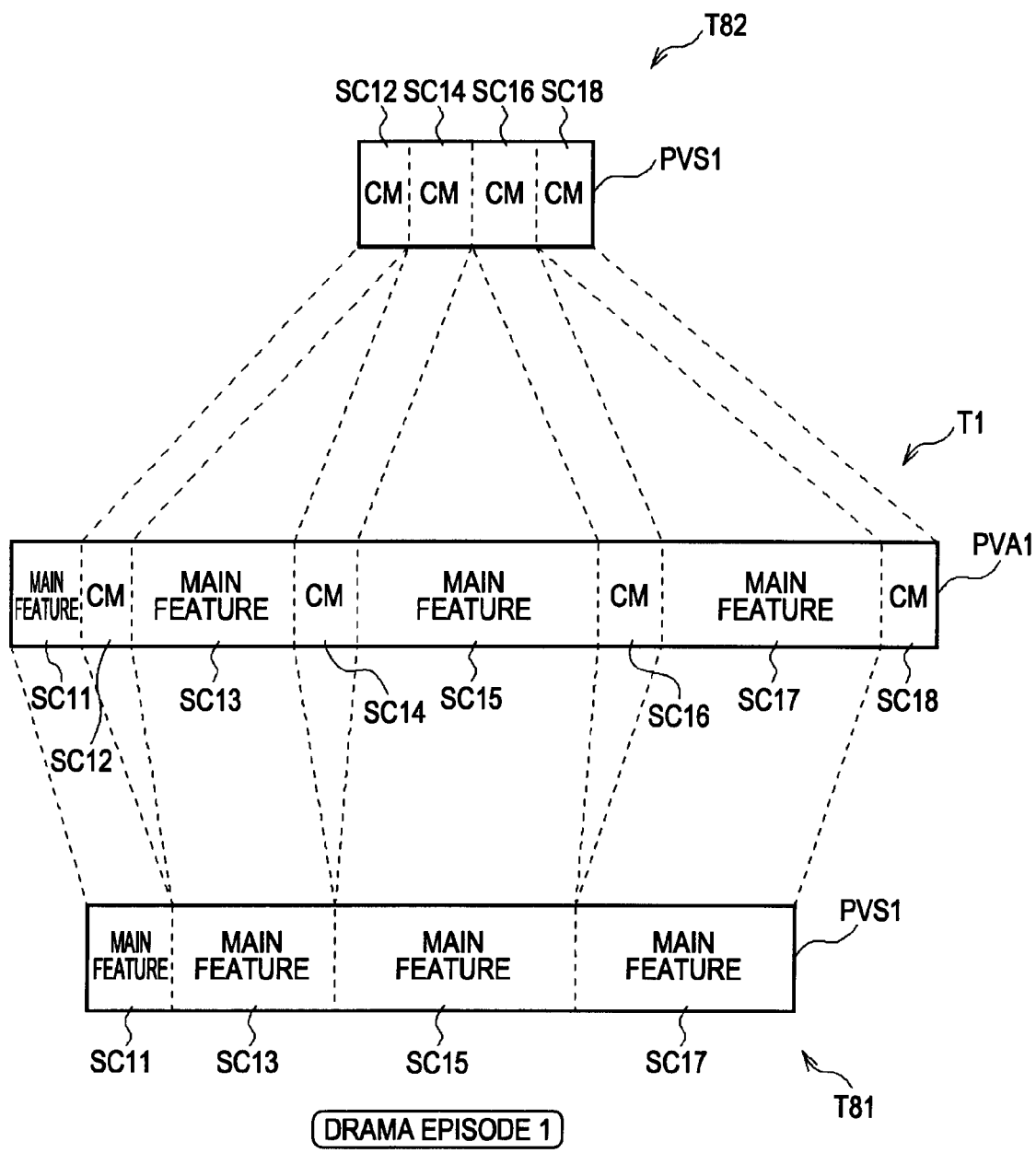
FIG. 37 is an outline diagram showing a configuration of an extracted playlist according to another embodiment.

For example, as shown in FIG. 37 corresponding to FIG. 10, in addition to an extracted playlist PVS1 where main feature scenes SC alone are extracted, an extracted playlist PVS11 where only commercial scenes SC have been extracted. In this case, as shown in FIG. 38, titles T1, T81, and T82 are displayed on the title display screen D20.

Alternatively, in a music program for example, an extracted playlists PVS may be generated of three types of "talk" scenes SC where performers talk or the like, "play" scenes SC where music is played, and "commercial" scenes SC having been extracted.

Further, with the above-described first embodiment, a case has been described wherein AV streams ST, virtual playlists PV, and so forth, are stored in the HDD 16 within the recording/playing device 1. The present invention is not restricted to this, and the AV streams ST, virtual playlists PV, and so forth, may be stored in an HDD or the like of a server connected via a network, for example.

Further, with the above-described embodiments, a case has been described wherein a storage unit 34 serving as a storage unit, a playlist generating unit 31 serving as a virtual playlist generating unit, a reception unit 35 serving as a reception unit, an editing unit 32 serving as an editing unit, and a title display control unit 33 serving as a title display control unit, make up the recording/playing device 1 serving as an information processing device.

However, the present invention is not restricted to this, and an information processing device may be configured of a storage unit, a virtual playlist generating unit, a reception unit, an editing unit, and a title display control unit, of various other configurations.

The present application contains subject matter related to that disclosed in Japanese Priority Patent Application JP 2009-111248 filed in the Japan Patent Office on Apr. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
    a storage unit configured to store content;
    a playlist generating unit configured to generate a real playlist of the content and a first virtual playlist of the content, the first virtual playlist comprising information identifying elements of the stored content;
    a reception unit configured to receive a request to edit the real playlist;
    an editing unit configured to, in accordance with the received instructions, edit the first virtual playlist to generate a second virtual playlist, the second virtual playlist comprising information identifying at least a portion of the content elements identified by the first virtual playlist; and
    a title display control unit configured to:
        receive a title display instruction to display a title of an element of stored content; and
        in response to the received title display instruction, generate an instruction to display the title of the stored content element based on the information associated with the second virtual playlist,
    wherein the first virtual playlist and the real playlist identify identical content elements.

2. The information processing device according to claim 1, wherein:
    the storage unit is further configured to store the first and second virtual playlists, the first and second virtual playlists being correlated with corresponding ones of the stored content;
    the playlist generating unit is configured to generate the first virtual playlist at a corresponding first generation time; and
    the editing unit is configured to generate the second virtual playlist at a corresponding second generation time subsequent to the first generation time.

3. The information processing device according to claim 2, wherein the editing unit is further configured to:
    receive an instruction to create a new title based on first virtual playlist; and
    establish the first virtual playlist as a current virtual playlist representing the new title.

4. The information processing device according to claim 2, wherein:
    the storage unit is further configured to store one or more additional virtual playlists, the additional virtual playlists being associated with generation times prior to the first generation time;
    the reception unit is further configured to receive a predetermined restoration instruction; and
    in response to the predetermined restoration instruction, the editing unit is further configured to:
        determine that the predetermined restoration instruction is associated with a corresponding one of the additional virtual playlists; and
        replace the corresponding one of the additional virtual playlists with the second virtual playlist.

5. The information processing device according to claim 4, wherein, in response to the predetermined restoration instruction, the editing unit is further configured to:
    determine that the predetermined restoration instruction is associated with first virtual playlist; and
    replace the first virtual playlist with the second virtual playlist.

6. The information processing device according to claim 4, wherein, in response to the predetermined restoration instruction, the editing unit is further configured to:
    generate an instruction to present a plurality of the additional virtual playlists and the first virtual playlist to a user; and
    receive, from the user, a selection of the displayed virtual playlists for restoration.

7. The information processing device according to claim 4, wherein the editing unit is further configured to generate an instruction to present a difference between the corresponding one of the virtual playlists and the second virtual playlist.

8. The information processing device according to claim 6, wherein the editing unit is further configured to:
  receive a difference display instruction from the user, the difference display instruction identifying a subset of the displayed virtual playlists; and
  in response to the difference display instruction, generate an instruction to display, to the user, differences between the subset of the displayed virtual playlists specified by the user.

9. The information processing device according to claim 6, wherein, the editing unit is further configured to generate an instruction to display, to the user, at least one of the additional virtual playlists or the first playlist with a corresponding.

10. The information processing device according to claim 1, further comprising a feature quantity obtaining unit configured to obtain feature quantities for each playing time of the content, by subjecting the content to predetermined analysis processing, wherein the playlist generating unit is further configured to:
  identify one or more extracting sections in the stored content based on the feature quantities;
  generate an extracted playlist representing playing information of the one or more extracting sections; and
  store the extracted playlist in the storage unit in a manner correlated with the content.

11. The information processing device according to claim 1, further comprising:
  a receiver unit configured to receive television broadcast waves;
  a program storage control unit configured to store television programs included in the television broadcast waves in the storage unit or an external storage unit as the content; and
  a genre determining unit configured to determine the genre of the television program from program information of the television program,
  wherein the virtual playlist generating unit generates the extracted playlist for the content made up of the television program.

12. The information processing device according to claim 1, wherein the real playlist and the first virtual playlist are generated in response to storing the content in the storage unit.

13. An editing method, comprising the steps of:
  generating a real playlist of content and a first virtual playlist of the content, the first virtual playlist comprising information identifying elements of the stored content;
  receiving a request to edit the real playlist;
  performing editing processing of the first virtual playlist in accordance with the received request to generate a second virtual playlist, the second virtual playlist comprising information identifying at least a portion of the content elements identified by the first virtual playlist;
  receiving a title display instruction to display a title of an element of stored content; and
  in response to the received title display instruction, generating an instruction to display the title of the stored content content on a display unit, the title being based on the information associated with the second virtual playlist
  wherein the virtual playlist and the real playlist identify identical content elements.

14. The method according to claim 13, wherein, the real playlist and the first virtual playlist are generated in response to storing the content in the storage unit.

15. The method according to claim 13, wherein:
  the method further comprises:
    storing the first and second virtual playlists in the storage unit, the first and second virtual playlists being correlated with corresponding ones of the stored content; and
    storing one or more additional virtual playlists in the storage unit, the additional virtual playlists being associated with generation times prior to the first time;
  the playlist generating unit is configured to generate the first virtual playlist at a corresponding first generation time; and
  the editing unit is configured to generate the second virtual playlist at a corresponding second generation time subsequent to the first generation time.

16. The method according to claim 15, further comprising:
  receiving a predetermined restoration instruction; and
  in response to the predetermined restoration, determining that the predetermined restoration instruction is associated with a corresponding one of the additional virtual playlists; and
  generating an instruction to replace the corresponding one of the additional virtual playlists with the second virtual playlist.

17. The method according to claim 16, further comprising:
  in response to the predetermined restoration, determining that the predetermined restoration instruction is associated with first virtual playlist; and
  generating an instruction to replace the first virtual playlist with the second virtual playlist.

18. A tangible, non-transitory computer-readable medium storing instructions that, when executed by at least one processor, cause the at least one processor to perform a method, comprising:
  generating a real playlist of content and a first virtual playlist of the content, the first virtual playlist comprising information identifying elements of the stored content;
  receiving a request to edit the real playlist;
  performing editing processing of the first virtual playlist in accordance with the received request to generate a second virtual playlist, the second virtual playlist comprising information identifying at least a portion of the content elements identified by the first virtual playlist;
  receiving a title display instruction to display a title of an element of stored content; and
  in response to the received title display instruction, generating an instruction to display the title of the stored content on a display unit, the title being based on the information associated with the second virtual playlist,
  wherein the virtual playlist and the real playlist identify identical content elements.

19. The computer-readable medium according to claim 18, wherein the method further comprises:
  receiving a predetermined restoration instruction;
  in response to the predetermined restoration, determining that the predetermined restoration instruction is associated with a corresponding one of the additional virtual playlists; and
  generating an instruction to replace the corresponding one of the additional virtual playlists with the second virtual playlist.

20. The computer-readable medium according to claim 19, wherein the method further comprises:
  in response to the predetermined restoration, determining that the predetermined restoration instruction is associated with first virtual playlist; and
  generating an instruction to replace the first virtual playlist with the second virtual playlist.

* * * * *